(12) United States Patent
Vandecruys

(10) Patent No.: US 11,555,277 B2
(45) Date of Patent: Jan. 17, 2023

(54) PERFORATED STRUCTURES

(71) Applicant: Materialise N.V., Leuven (BE)

(72) Inventor: Dries Vandecruys, Leuven (BE)

(73) Assignee: Materialise NV, Leuven (BE)

( * ) Notice: Subject to any disclaimer, the term of this patent is extended or adjusted under 35 U.S.C. 154(b) by 536 days.

(21) Appl. No.: 16/624,856

(22) PCT Filed: Jun. 22, 2018

(86) PCT No.: PCT/US2018/039018
§ 371 (c)(1),
(2) Date: Dec. 19, 2019

(87) PCT Pub. No.: WO2018/237279
PCT Pub. Date: Dec. 27, 2018

(65) Prior Publication Data
US 2022/0002951 A1 Jan. 6, 2022

Related U.S. Application Data

(60) Provisional application No. 62/523,588, filed on Jun. 22, 2017, provisional application No. 62/534,077, filed on Jul. 18, 2017, provisional application No. 62/634,703, filed on Feb. 23, 2018, provisional application No. 62/641,584, filed on Mar. 12, 2018.

(51) Int. Cl.
*D21J 7/00* (2006.01)
*D21J 3/00* (2006.01)
*B33Y 80/00* (2015.01)

(52) U.S. Cl.
CPC . *D21J 7/00* (2013.01); *D21J 3/00* (2013.01); *B33Y 80/00* (2014.12)

(58) Field of Classification Search
CPC ....... D21J 3/00; D21J 7/00; D21J 5/00; B33Y 80/00
USPC .......................................... 162/218
See application file for complete search history.

(56) References Cited

U.S. PATENT DOCUMENTS 3,284,284 A * 11/1966 Wells ........................ D21J 5/00
162/383
7,909,964 B2 * 3/2011 Nilsson ..................... D21J 7/00
162/376
10,435,848 B2 * 10/2019 Andersson ................ D21J 7/00

FOREIGN PATENT DOCUMENTS

WO 2016101976 A1 6/2016

* cited by examiner

*Primary Examiner* — Mark Halpern
(74) *Attorney, Agent, or Firm* — Dinsmore & Shohl LP

(57) ABSTRACT

Disclosed herein are perforated structures and methods for their manufacture. The perforated structures comprise zones of perforations, which are optimized for controlling the flow of gas or liquid through the perforated structure. The perforated structures may be configured for use as molds and for manufacture by additive manufacturing processes.

14 Claims, 15 Drawing Sheets

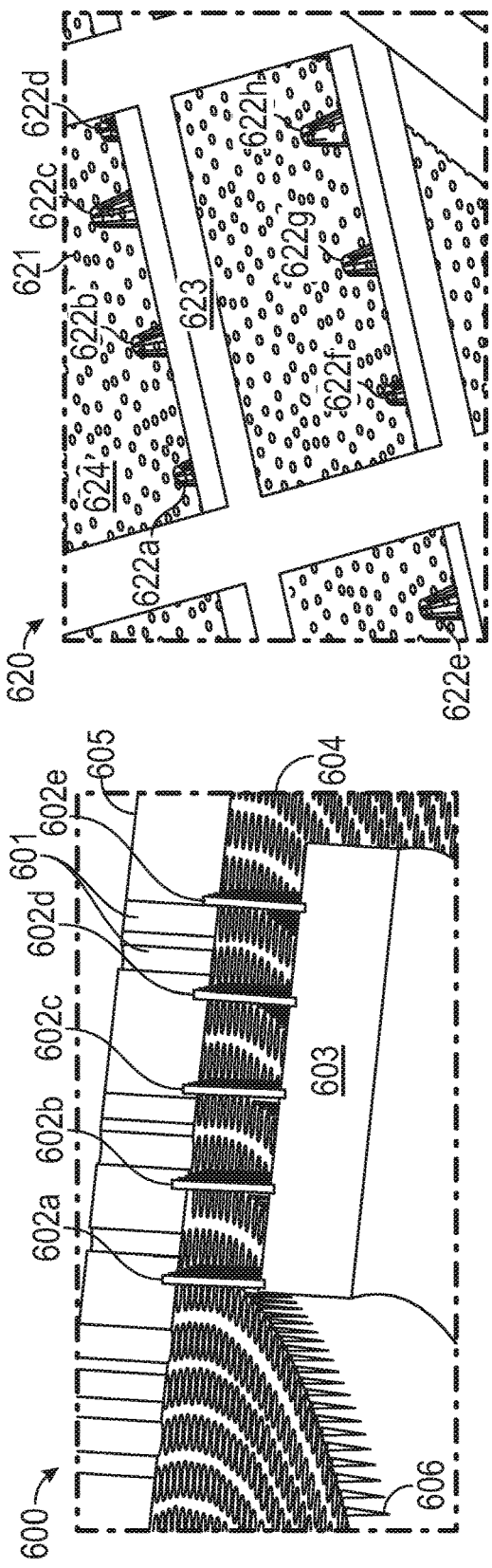
FIG. 6A
FIG. 6C
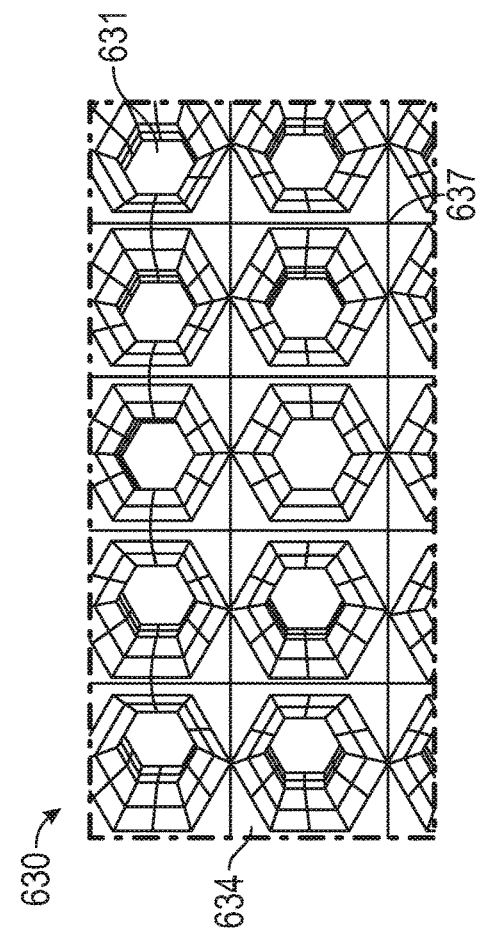
FIG. 6D
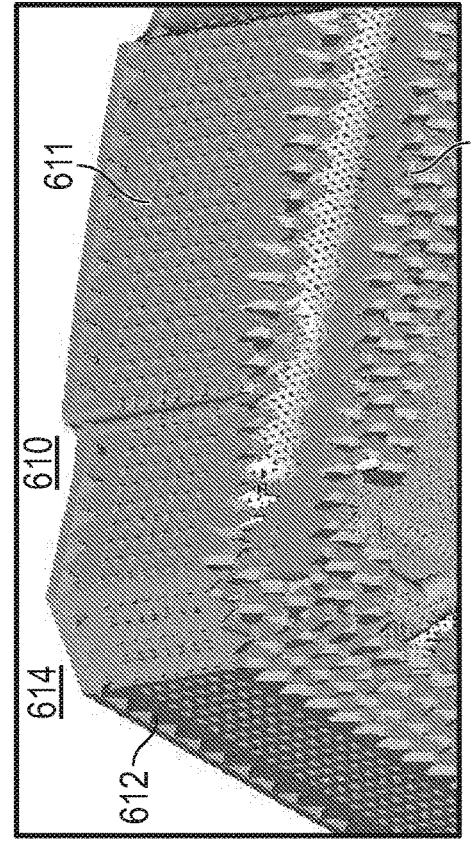
FIG. 6B

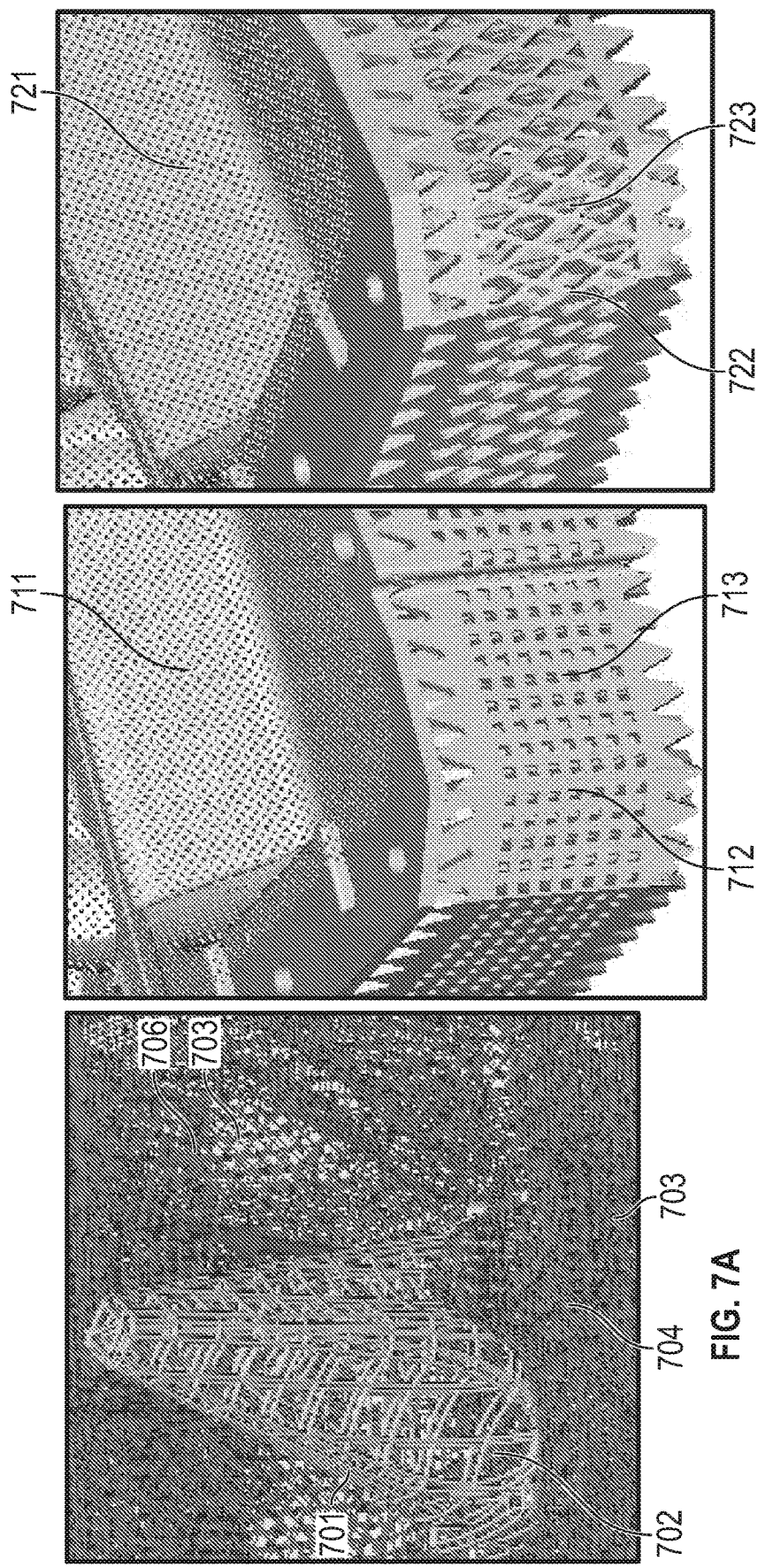

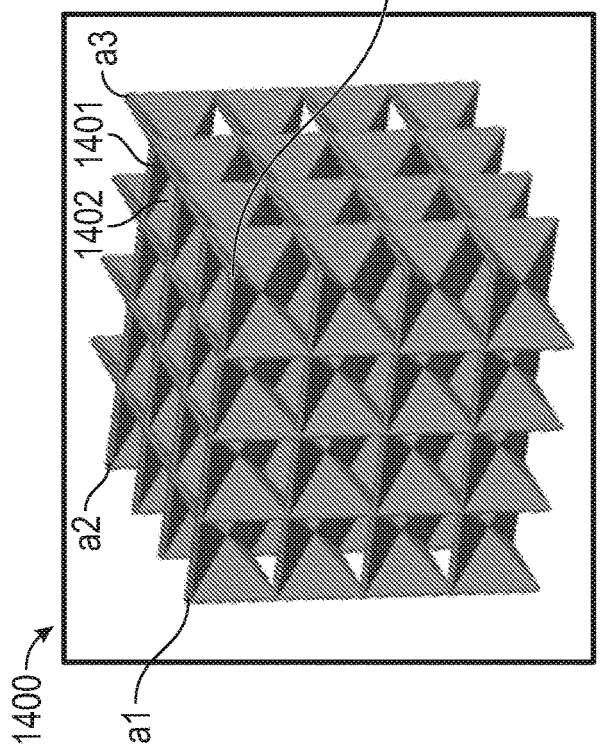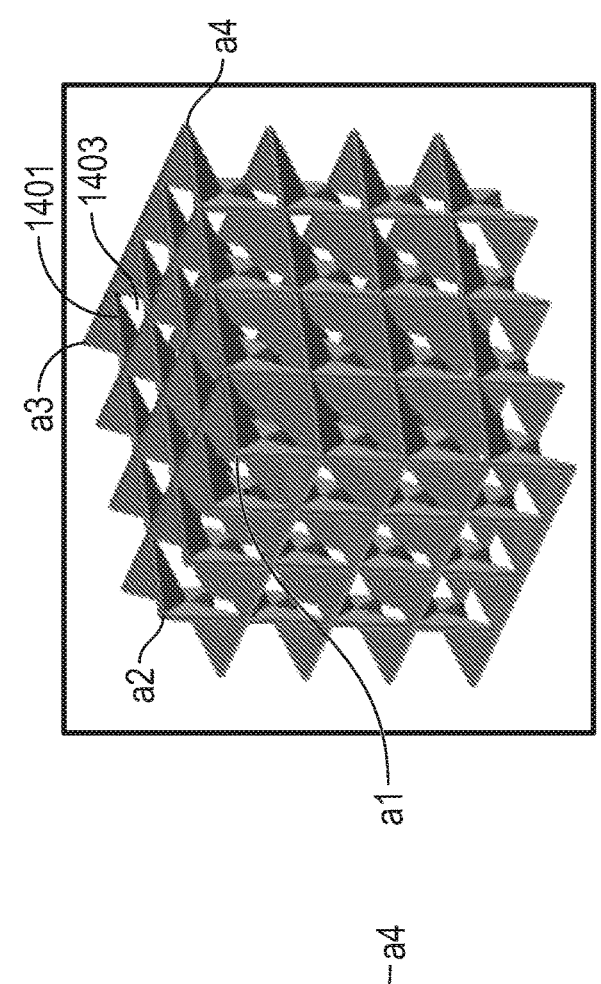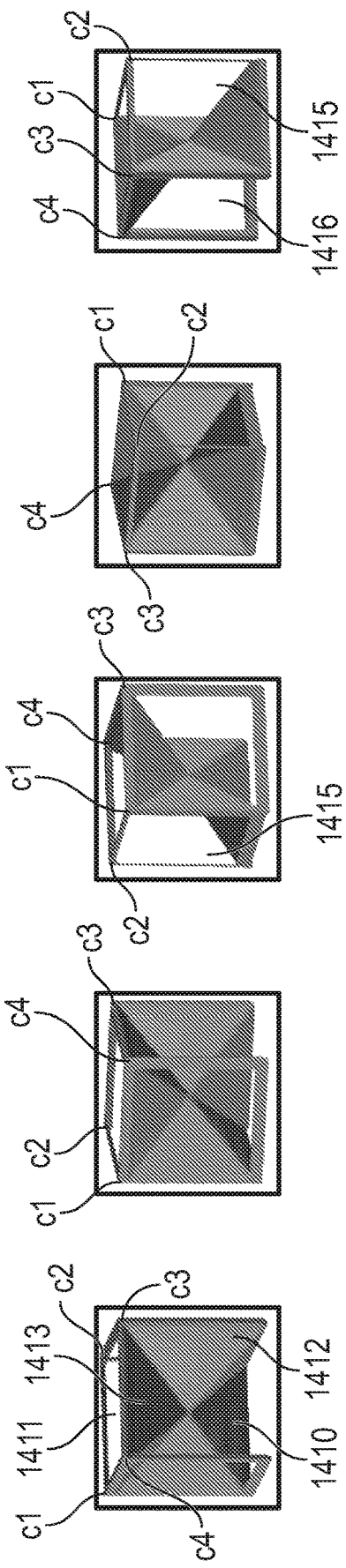
FIG. 14A
FIG. 14B
FIG. 14C

PERFORATED STRUCTURES

CROSS-REFERENCE TO RELATED APPLICATIONS

This application is a 371 of PCT/US2018/039018 filed 22 Jun. 2018. This application claims priority to U.S. Provisional Patent No. U.S. 62/523,588, filed on 22 Jun. 2017; U.S. Provisional Patent Application No. 62/534,077, filed on 18 Jul. 2017; U.S. Provisional Patent Application No. U.S. 62/634,703, filed on 23 Feb. 2018; and U.S. Provisional Patent Application No. U.S. 62/641,584, filed on 12 Mar. 2018. The content of each of the provisional applications is hereby incorporated by reference in its entirety.

BACKGROUND OF THE INVENTION

Field of the Invention

The field of the invention is perforated structures that control movement of materials through perforations located in or on the perforated structure. Example perforated structures are molds for manufacturing paper or fiber products. The molds may comprise specific structural features, and may be optimized for a variety of manufacturing methods including additive manufacturing.

Description of the Related Technology

Perforated structures designed for optimal function, ease of use, and efficient manufacture may be illustrated by an example perforated structure, a mold for making fiber-based materials. Many disposable or limited-use products are manufactured using molds. Paper cartons, trays and drink holders, conformal packaging, and hygiene products such as sanitary pads and diapers are made from raw materials which are formed onto molds. Traditionally, to make a mold for manufacturing fiber-based products, first a sturdy material like steel is machined into a shape that is the reverse complement of a product, and then a mesh or porous screen is pressed into a conformal shape overlying the mold. To produce a product from the mold, raw materials such as paper pulp slurry, cellulose, wood or wood-derived products, polymer foam, shredded paper, or cotton wadding are applied to mesh screen on the mold. Either water or air, depending on the composition of the original raw material, is drawn through the mesh screen, leaving raw material which takes the shape of the underlying mold.

While this traditional combination of screen-and-mold have been used in manufacturing for decades, there are specific challenges associated with the approach. Machining is an expensive and time-consuming way to produce molds, which limits the number of molds and types of molds that can be produced. In addition, the molds are typically used for many products over long periods of time, in order to realize a return on the costs of producing a mold. These limitations impact decisions about which products can be made, and, in some cases, can negatively affect development of new designs for products.

A further limitation to the traditional screen-and-mold system is that screens often retain residual material, instead of releasing the molded products cleanly. Paper pulp residue can accumulate in holes in the screen and block drainage of water. Fragments of shredded paper or cotton wadding can be drawn through holes in the screen along with air, and the fragments rip as the product is removed from the screen. This results in either a jagged surface on the product, or shreds of material left behind on the screen. Blocked molds can lead to poor quality products and/or time delays if the production is stopped to clean the screens.

One solution to these problems is a one-piece mold design that has openings on the surface of the mold coupled with drainage channels. The screen alone, separated from the mold, has the shape of the mold and could be used to shape a product. However, the screen is not strong enough to support the forces applied by suction or the weight of the product. Indeed, the screen primarily functions as a spacer between the mold and the product, and facilitates removal of the product from the mold. Other one-piece designs may have openings and channels that replicate the function of the traditional system, but do not require a screen. Such molds may be manufactured by additive manufacturing (AM). In general, AM is faster than machining, depending on the materials used and the complexity of the design. Moreover, AM offers design flexibility to produce molds with shapes and pores that would be difficult or impossible to machine or form by other manufacturing methods. However, some AM solutions may not be optimized for producing molds in all shapes, for example, molds designed for products with deep internal grooves or varying densities. Moreover, some AM solutions do not offer optimized ratios of air-to-material like those obtained with the wire screens of the traditional systems. Accordingly, there is a need in the art for optimized molds, for example, those made in one piece by additive manufacturing.

SUMMARY

Perforated structures comprising structural features and elements are described herein. A first aspect of the present disclosure relates to a perforated structure such as a mold configured for shaping a product from a fiber-based material, the mold comprising a plurality of perforations each configured to contact the fiber-based material, wherein the plurality of perforations comprise: a first set of perforations substantially identical to one another configured in a first zone on the mold; and a second set of perforations substantially identical to one another configured in a second zone on the mold, wherein the first set of perforations differs from the second set of perforations in at least one of number of perforations, spacing between perforations, and geometry of perforations, and wherein the first zone and the second zone together are at least in part configured to form a shape that is conformal to the product.

In some embodiments, the mold may be a one-piece structure. The mold may be manufactured by additive manufacturing.

A product formed on the mold may comprise at least a portion of one of a carton, tray, conformal packaging, a feminine hygiene product, or a diaper. A fiber-based material may comprise a raw material comprising one or more of paper pulp, cellulose, wood, wood-derived products, foam, polymer foam, shredded paper, or cotton wadding.

In certain embodiments, each perforation of the plurality of perforations comprises a first opening that contacts the fiber-based material and a second opening. The first and the second openings may be separated by a space. The first and the second openings may each configured to allow gas and/or liquid to pass through the first and second openings. At least one of the first and the second openings may be configured to restrict fiber-based material from passing through.

The first opening may be larger than the second opening. The first set of perforations may be substantially identical in geometry to one another. Geometry may comprise size, shape, volume, cross-sectional area, orientation in space, and relative position to neighboring perforations.

In certain embodiments, the first zone may be located adjacent to the second zone. The first zone may not be located adjacent to the second zone. The first zone may be separated from the second zone by one or more zones, each of the one or more zones comprising its own set of perforations. The first zone may be separated by a physical barrier from the second zone. The physical barrier may be a solid structure with no perforations.

In some embodiments, the first zone is located in the same plane as the second zone. The first zone may not be located in the same plane as the second zone. The first zone may be positioned either directly above or directly below the second zone.

The first zone may correspond to a structural element on the mold, wherein the structural element is one of a protrusion, a flat surface, an angled surface, a recess, or a physical support structure. The first zone may be a protrusion and the second zone may be a flat surface, and the first set of perforations in the first zone may be larger in at least one of number of perforations and size of perforation as compared with the second set of perforations in the second zone.

The first set of perforations and the second set of perforations may be configured to distribute a uniform density of the fiber-based material across both the first zone and the second zone. The first set of perforations and the second set of perforations may be configured to distribute a higher density of the fiber-based material in the first zone than in the second zone. The plurality of perforations may further comprise at least a third set of perforations in a third zone.

A further aspect of the present disclosure relates to a perforated structure such as a mold or a 3D printed mold configured for shaping a product from a fiber-based material, comprising a first surface configured to conform to the product; a second surface; a plurality of perforations, each comprising a first opening at the first surface and a second opening at the second surface; and at least one support structure, wherein the support structure is configured to contact the second surface of the perforated structure only in one or more spaces located between the second openings of the plurality of perforations. The perforated structure may be a one-piece structure. The support structure may be a columnar structure and/or may be an elongated structure.

The support structure may be configured to contact the second surface of the 3D printed mold in more than one space located between the second openings of the plurality of perforations. The support structure may comprise an array of support structures, each configured to join a base structure. The base structure may be spaced apart from the second surface of the mold. The support structure may be a solid structure without perforations. The support structure may comprise perforations. The support structure may be configured to support the mold at one or more locations, wherein the locations are at least one of overhang areas of the mold and areas subject to forces when the mold is used.

Another aspect of the present disclosure relates to a perforated structure configured to direct material along a non-linear path, comprising a plurality of lattices arranged in a stack and comprising a first lattice comprising a first array of beams configured to form at least one first open space, and a second lattice comprising a second array of beams configured to form at least one second open space, wherein the first and second lattice are adjacent to each other, and wherein the first array of beams has a different configuration from the second array of beams, and wherein the at least one first open space partially overlaps a portion of the second array of beams.

The first and second lattice may be configured to direct material through the at least one first open space and around the portion of the second array of beams. The at least one first open space may be located in a first surface of the perforated structure and is configured as an inlet perforation to the perforated structure. The at least one second open space is configured to act as an outlet perforation.

The perforated structure may further comprise at least a third lattice comprising a third array of beams configured to form at least one open space, wherein the third lattice is adjacent to the second lattice, and wherein the third array of beams has a different configuration from the second array of beams, and wherein the at least one second open space partially overlaps a portion of the third array of beams.

The perforated structure may further comprising n additional lattices where n is an integer, wherein each of the n additional lattices has an array of beams configured to form at least one open space, and wherein each adjacent lattice comprises an array of beams that has a different configuration from the array of beams in one or more adjacent lattices in the stack, and wherein the at least one open space in each lattice partially overlaps a portion of the array of beams in the one or more adjacent lattices in the stack. In some embodiments, an nth additional lattice may comprise at least one nth open space that is configured as an outlet perforation to the perforated structure.

The nth additional lattice may be located on a surface of the perforated structure that is opposite to the first lattice. The non-linear path may comprise a path following at least one of a series of steps that change direction at an angle, a spiral, and a series of non-regular direction changes.

The material moving through the perforated structure may be a gas or a liquid.

The plurality of lattices may be arranged in a vertical stack. The first lattice and the second lattice may each comprise a border formed by beams. At least one of the first and second array of beams may comprise a patterned array of beams, such as a grid.

The at least one of the first and second array of beams comprises at least one beam oriented in a first direction and at least one beam orientated in a second direction. The first direction and the second direction may be orthogonal to each other. At least one of the first and second array of beams may comprise at least a first beam laid across at least a second beam. At least one of the first and second array of beams comprises two or more beams joined to each other at nodes. At least one of the first and second array of beams may comprise two or more beams, each joined at their ends form to a single open space. At least one of the first and second of beams may comprise a straight beam. At least one of the first and second of beams may comprise a curved beam.

The first array of beams may differ from the second array of beams in one or more of a number of beams in the array, rotation of the array of beams with respect to a central axis through the stack of lattices, and size of the open space between the beams.

At least one first open space is larger than the at least one second open space.

The perforated structures may further comprise one or more support structures configured to support at least one of the first lattice and the second lattice. One or more support structures may be configured to support the first lattice, and one or more support structures may be located in the second lattice.

Still another aspect of the present disclosure relates to a method for manufacturing a perforated structure configured to direct material along a non-linear path, comprising: receiving, in a computing device, outer dimensions of the perforated structure, and geometries of a plurality of lattices; and manufacturing, in an additive manufacturing device, the plurality of lattices, wherein the plurality of lattices is arranged in a stack and comprises a first lattice comprising a first array of beams configured to form at least one first open space, and a second lattice comprising a second array of beams configured to form at least one second open space, wherein the first and second lattice are adjacent to each other, and wherein the first array of beams has a different configuration from the second array of beams, and wherein the at least one first open space partially overlaps a portion of the second array of beams.

In some embodiments, the method for manufacturing a perforated structure further comprises steps of scanning the first array of beams, and scanning the second array of beams. One or more support structure may be configured to support the first array of beams, and may be scanned. The one or more support structures may comprise a different material than the first and second array of beams.

BRIEF DESCRIPTION OF THE DRAWINGS

FIGS. 6A-6D show example support structures on perforated structures.

FIGS. 7A-7C show example zones on protrusions in perforated structures, and example perforations in the zones.

FIGS. 14A-14C show example perforations in a perforated structure comprising unit cells.

DETAILED DESCRIPTION OF CERTAIN INVENTIVE EMBODIMENTS

Embodiments of this disclosure relate to perforated structures in which perforations control movement of one or more materials through a structure. Perforated structures may comprise a plurality of perforations having geometries, locations, and orientations that enable and/or restrict the movement of a material. Example perforated structures comprise devices such as filters, catalysts, heat exchangers, insulating structures, cushioning structures, extruders, suction grippers, molds, and more. Perforated structures like these and others may have specific size or shape requirements and/or complex geometries either internally or externally, any of which may pose a challenge for designing perforations that control movement of a material through the perforated structure.

One aspect of the present disclosure relates to perforated structures comprising zones of perforations. In certain embodiments, a perforated structure may comprise one or more zones, wherein each zone comprises a plurality of perforations that may be substantially identical to one another but may differ from a plurality of perforations in other zones. For example, while a first set of perforations in a first zone may be substantially identical to one another, the first set of perforations may differ from a second set of perforations in a second zone, for example, in a measure comprising at least one of: number of perforations, spacing between perforations, geometry of perforations, orientation of perforations in xyz space, and path through the perforated structure. A set of perforations in a given zone may be substantially identical to one another in these measures. The perforated structure may be manufactured by additive manufacturing. In some embodiments, the perforated structure is a mold.

Figure 5C:
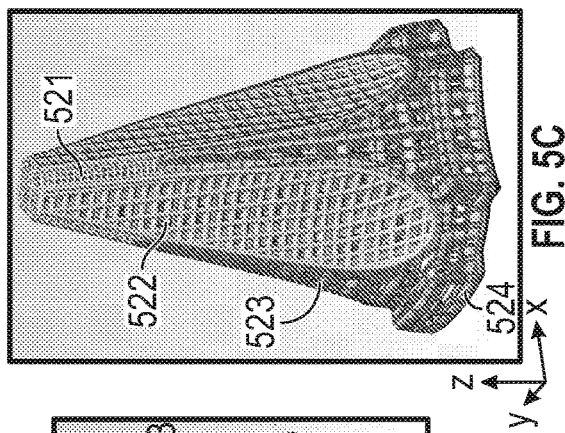
FIGS. 5A-5D show examples of different types of zones on perforated structures.
Figure 5B:
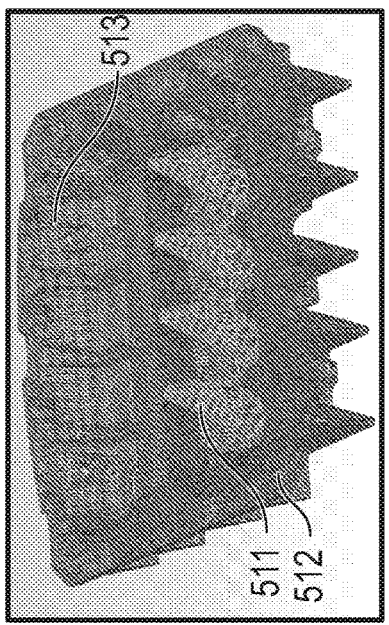
Figure 5A:
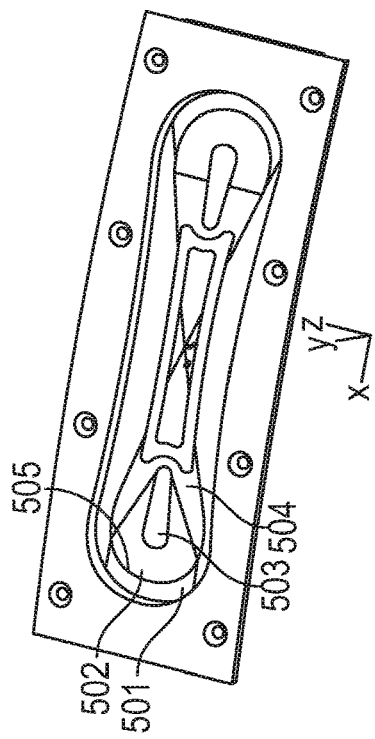

FIGS. 5A-5D show examples of perforated structures comprising zones of perforations. Zones may be located adjacent to one another or may be stacked in layers. Zones may correspond to different portions of the perforated structure. In FIG. 5A, zones are adjacent to one another on the surface of the perforated structure. Zones 501, 502, 503, and 504 are indicated, as is a border 505 in between zones 501 and 502. In FIG. 5B, zones correspond to portions of the perforated structures that are structural features. For example, zone 511 corresponds to cone-shaped protrusions in the perforated structure, while zone 512 corresponds to a flat surface, and zone 513 corresponds to a side wall. A structural feature may comprise a plurality of zones, as in FIG. 5C, where a single cone-shaped protrusion comprises zones 521, 522, 523, as well as internal zone 524. In FIG. 5C, zones 531, 532, and 533 are stacked on top of each other in layers.

A zone (also called a portion, region, part, sector, area, place, or locality) may correspond to a feature on the perforated structure that may be distinguished from other features corresponding to other zones of the perforated structure. An example feature may be a protrusion, an indentation, a hollow, a wall that is thicker or thinner than one or more other walls in the perforated structure, a location in the space of the perforated structure, and/or a location on a surface of the perforated structure. A zone may be located on the feature and/or may be defined by the borders of the feature. In some embodiments, a zone may be defined by a feature having a plurality of perforations that are substantially identical to one another. For example, a perforated structure may comprise a first protrusion having a plurality of perforations that are substantially identical to one another. This first protrusion may be defined as a first zone of the perforated structure. A zone may comprise a row of identical unit cells in the same orientation as one another.

In certain aspects, the perforated structure may comprise at least two zones, a first zone comprising a first set of perforations that are substantially identical to one another and a second zone comprising a second set of perforations that are substantially identical to one another, wherein the first set of perforations differs from and the second set of perforations. In an example perforated structure, a first zone may correspond to a feature such as a protrusion, while the second zone may correspond to a flat surface. In this example, a first set of perforations on the protrusion may be substantially identical to one another, but may differ from the second set of perforations on the flat surface.

In some embodiments, zones correspond to layers (also called lamina, stacks, sheets, or cross-sections) of the perforated structure, wherein each layer has a plurality of perforations that are substantially identical to one another. Accordingly, zones may be stacked on top of each other, and each zone may comprise a set of perforations that differs from at least one other set of perforations in another zone.

In certain embodiments, the perforation structure comprises a plurality of zones located along a first surface (or plane) of the perforated structure. The first surface of the perforated structure may be divided into a plurality of zones, each zone having a set of perforations that differs from a set of perforations in at least one other zone. Zones may be separated by a physical structure at the border, such as a wall, or by other zones. Zones may be separated only where a first set of perforations in a first zone ends and a second set of perforations in a second zone begins.

The first zone may not be adjacent to the second zone. The perforated structure may comprise one or more additional zones. In some embodiments, the first zone may be separated from the second zone by one or more zones, each of the one or more zones comprising its own set of perforations. In general, a set of perforations in a given zone may differ from a set of perforations in an adjacent or neighboring zone.

The perforated structure may be a one-piece structure, like the structures in FIG. 5A. A one-piece structure may comprise individual components that are fastened together, for example, by fastening means such as screws, bolts, or adhesives. A one-piece structure may comprise parts added to an existing structure. For example, a portion of a perforated structure may be manufactured to replace a damaged portion of the perforated structure or to interchange a part. A one-piece structure may be a single functional unit, such as a mold, comprising component portions. For example, a perforated structure that is a mold may comprise a first removable insert for a first product of a specific size, and a second removable insert for forming products of a second size. Alternatively, a one-piece structure may comprise a uni-component structure that is undivided and/or indivisible, for example, a structure that cannot be separated into individual components except by breaking or destroying elements of the structure. For example, a one-piece structure may comprise zones having different geometries, but the zones cannot be separated except by breaking the one-piece structure apart. For example, the zones may be continuous with one another. The one-piece structure may comprise zones that are linked together to form the one-piece structure, wherein one or more links must be broken in order to separate the zones. One-piece structures may comprise a single material, or one-piece structures may comprise more than one material, wherein the materials are joined or fused together to form the one-piece structure. In some embodiments, a one-piece structure may be built by additive manufacturing in a single build session.

Figure 8B:
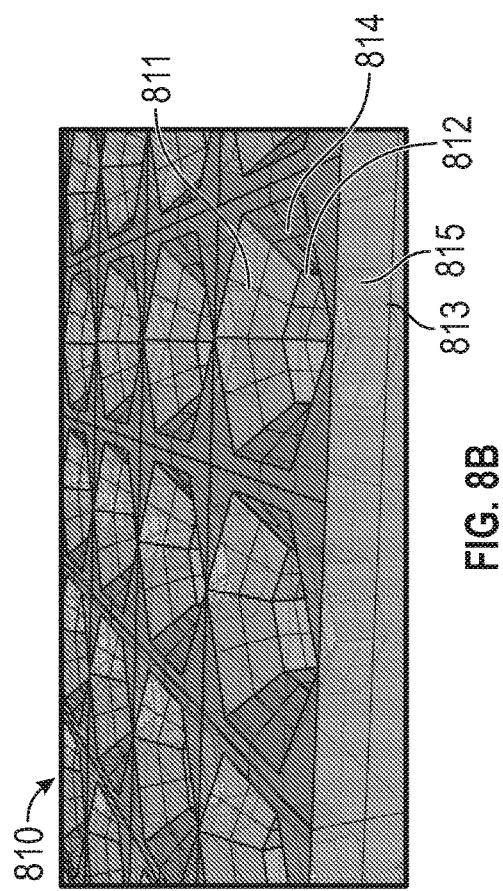
FIGS. 8A-8G show an example array of perforations having a funnel shape and an example cross section in a geometric shape.
Figure 8C:
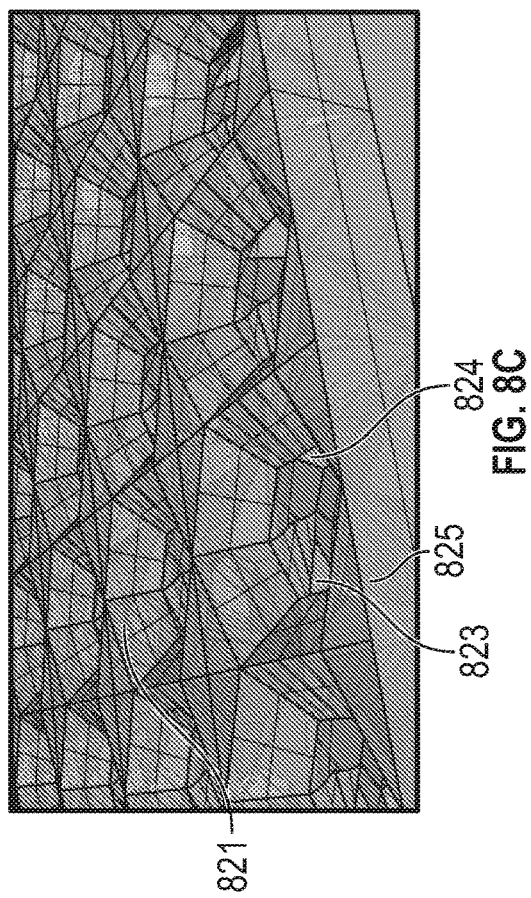
Figure 8A:
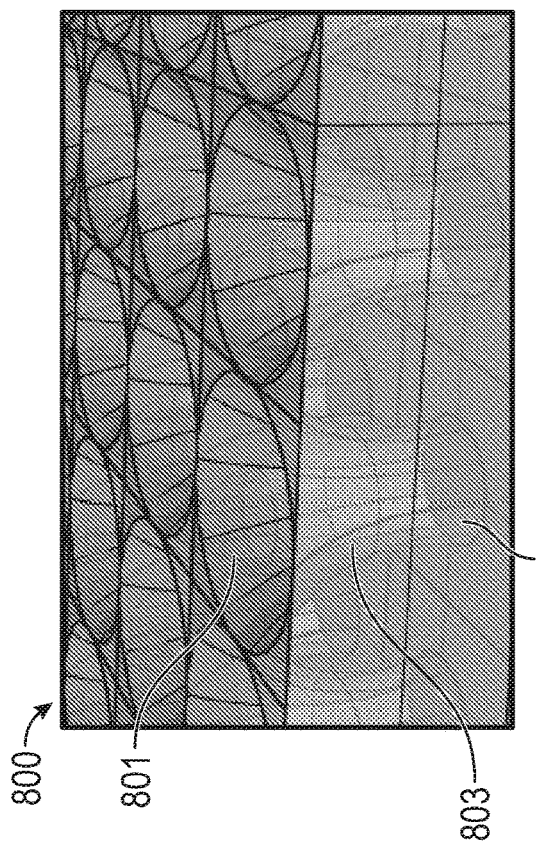
Figure 8G:
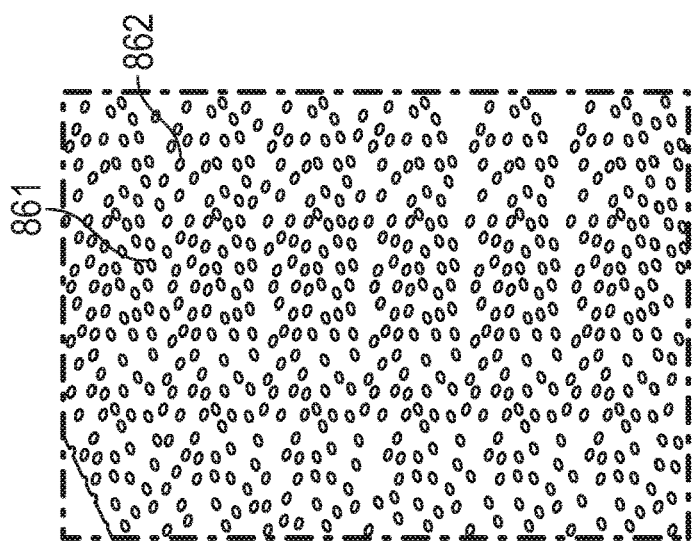

In some embodiments, a perforation (also called a pore, hole, opening, cavity, or hollow) may comprise at least one open space such as an inlet into which a material may pass, and at least one second open space. FIGS. 8A-8G shows examples of perforations. A first open space 801 and a second open space 802 are indicated in FIG. 8A. The perforation may further comprise a channel or a segment of a channel 803 along which the material passes. The channel may be either enclosed along its length as in 803 or may open on one or more places along its length. In some embodiments, the perforation comprises at least one second open space such as an outlet out of which a material may pass. Accordingly, a perforation may refer to only an open space, such as an inlet 801 or an outlet 802, or a perforation may refer to at least one open space in combination with a channel or a segment of a channel, e.g. the entirety of 801, 802, and 803. Perforations may direct material such as gas or liquid along a linear path, a non-linear path, or any combination of these.

Figure 8F:
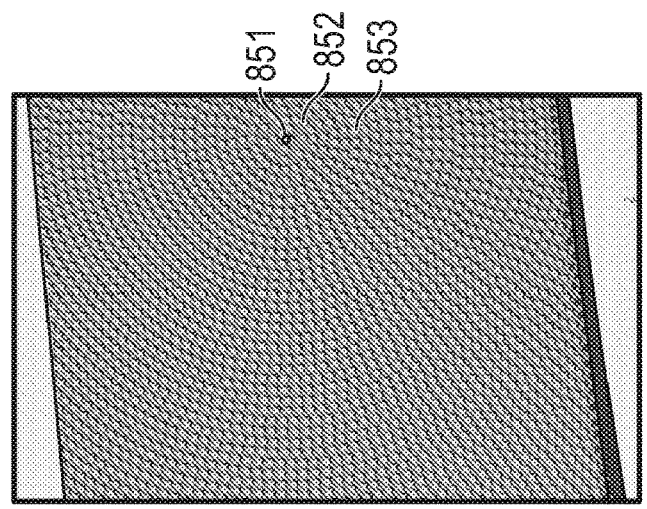
Figure 8D:
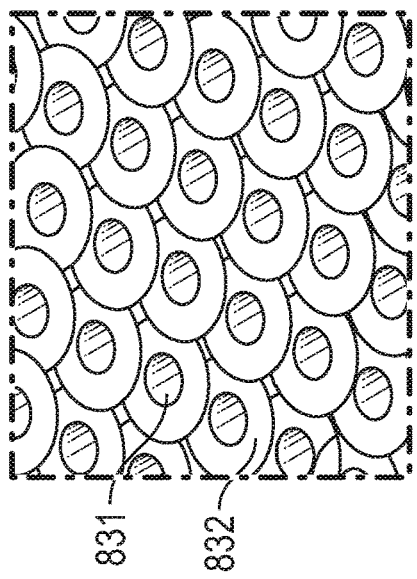
Figure 8E:
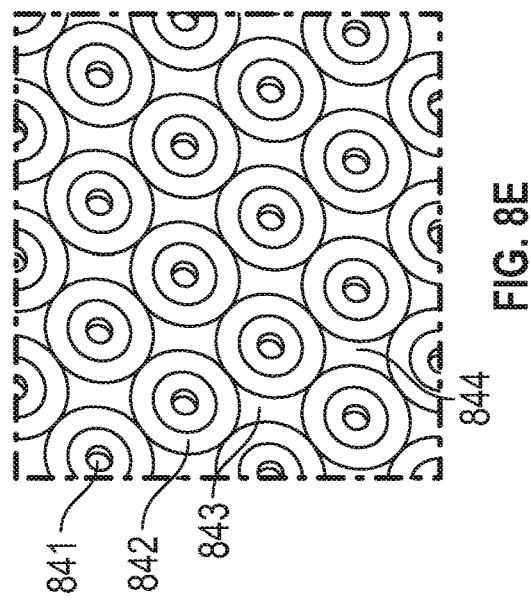

A perforation may comprise different geometric features or geometries. FIGS. 8A-8E shows examples of perforations having different geometries. In FIG. 8A, both the first opening 801 and the second opening 802 are a round or circular in shape. The first and second openings 801 and 802 may have different cross sectional areas, as first opening 801 has a larger cross sectional area than second opening 802, and the channel 803 is conical in shape. In FIG. 8B, the perforation comprises a first opening 811, a second opening 812, and a third opening 813 each of which are hexagonal in shape. Opening 811 is larger in cross sectional area than openings 812 and 813, but openings 812 and 813 have an equivalent cross sectional area. The perforation of FIG. 8B also comprises two channels, channel 814 which tapers and channel 815 which is straight. In some embodiments, a perforation comprising a combination of two or more openings and channels that vary, for example in size, shape, or capacity for holding material, may be configured to allow gas and liquid to pass through a select opening and channel, whereas certain material may be blocked from passing through. For example, gas or liquid may pass through first and second openings, while a raw material such as a fiber-based material may be blocked or restricted from passing through a first and/or a second opening. FIG. 8C shows perforations, each comprising a first opening 821 in the shape of a hexagon, which may an inlet. Each perforation further comprises a third opening 823, fourth opening 824, and fifth opening 825, which may be outlets. Accordingly, perforations may comprise multiple openings as inlets, outlets, or both. FIG. 8D shows an array of perforations comprising a first opening (e.g., opening 831) and at least one second opening (not visible), wherein the perforations are interspersed with geometric spaces such as 832 which comprise only a first opening. The geometric spaces may not allow material to flow through, and may be used for trapping excess material inside or regulate flow of material by restricting access while the perforations allow access. FIG. 8E shows a perforation comprising a first opening 841 that is raised above a plane 843, for example by a protrusion 842 that projects from the surface of the plane 843. An array of perforations thus arrayed may comprise geometric spaces such as spaces 844, which comprise a first opening bounded by the walls of neighboring protrusions, but do not have a second opening.

Perforations in FIGS. 8A-8E are organized in a patterned array. In some embodiments, the perforations may be arrayed in a repeating pattern. The perforations may be arrayed in a pattern of concentric outlines. FIG. 8F shows a pattern of perforations in which perforations are arrayed in circles (e.g., 852 and 853) that radiate outwards from a central perforation 851. Perforations may be randomly arrayed, as in sample perforations 861 and 862 in FIG. 8G, which are not positioned in a specific defined pattern with respect to each other or to any other perforations in the array.

Figure 13B:
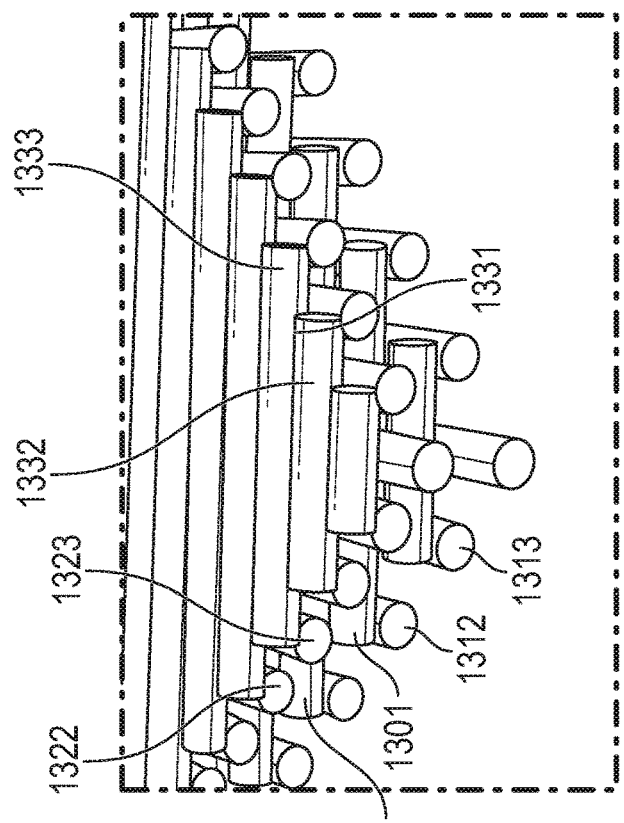
FIGS. 13A-13B show example perforations formed in between beams.
Figure 13A:
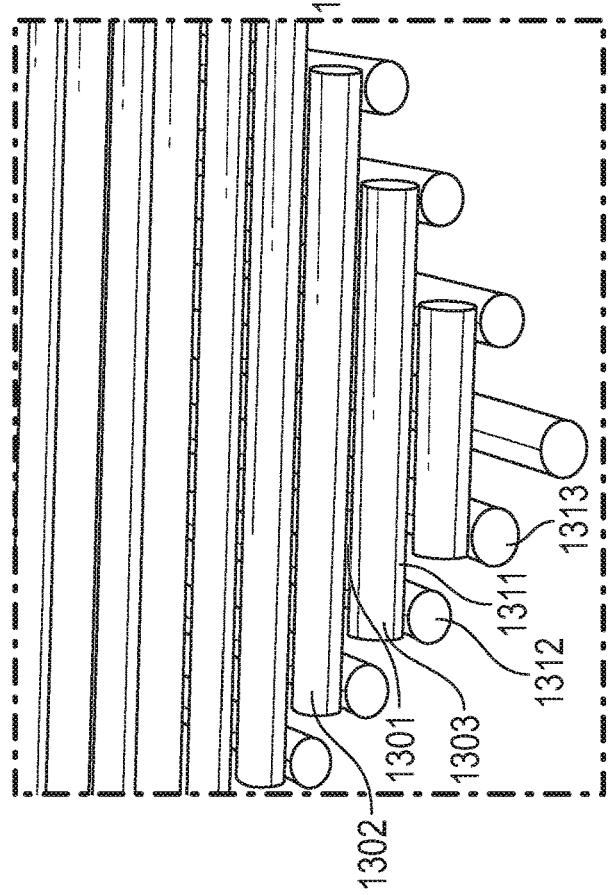

A perforation may comprise an open space of varied dimensions. FIGS. 13A-13B show configurations in which perforations are formed in spaces between beams. Referring to FIG. 13A, a first opening 1301 is an elongated opening in between beams 1302 and 1303, while a second opening 1311 is an elongated opening in between beams 1312 and 1313. Beams 1301 and 1302 are orthogonal to beams 1312 and 1313, and moreover, beams 1302 and 1303 are laid across beams 1312 and 1313. As a result, the perforation has a shape that is bounded by beams in different orientations and different elevations (e.g., beams in planes above or below). In FIG. 13B, more beams are laid orthogonal to beams 1302 and 1303, for example, beams 1322 and 1323. The additional beams may be spaced apart to create additional perforations comprising openings that are either similar to or different from openings 1301 and 1311. For example, an opening 1331 located between beams 1332 and 1333 may be narrower than an opening 1301, because the beams 1332 and 1333 are closer together than beams 1302 and 1303.

FIGS. 14A-14B show an example of a perforated structure comprising perforations that are formed in between angled walls. In FIG. 14A, an example perforated structure 1400 comprises a perforation 1401 that has a first opening 1402. No other openings in perforation 1401 are visible from this view. In FIG. 14B, the perforated structure has been rotated about 90 degrees around a central axis. Corners a1, a2, a3, and a4 of the perforated structure are marked as references. In the view in FIG. 14B, the second opening 1403 in perforation 1401 is visible, and is angled relative to the first opening. The angled walls may direct material in a non-linear path through the perforated structure 1400, as material entering the first opening 1402 flows along an angled wall and through the second opening 1403.

Walls of perforations may be straight or curved, and may be angled relative to the plane in which an opening is located. Walls may be borders of individual unit cells. The unit cells may be stacked or layered or placed next to each other to form an array. An example unit cell 1410 is shown in FIG. 14C, with corners c1, c2, c3, and c4 marked for reference. Five different angles of the unit cell 1410 show a first opening 1411 and angled internal walls such as 1412 and 1413. Opening 1415 may be a second opening and opening 1416 may be a third opening. Either opening may be fully or partially blocked when a wall from a neighboring unit cell is placed next to unit cell 1410. A perforated structure comprising unit cells and angled walls may be configured with unit cells having wall thicknesses, angles, and/or internal structures that are selected to slow or speed or otherwise influence the movement of material through the perforated structure.

Perforated structures may comprise an array of unit cells, each having angled walls. Each unit cell may have at least one inlet opening and at least one outlet opening. Each unit cell in the plurality of unit cells may be identical, and unit cells may be arrayed in groups such as rows or stacks of rows. For example, a first plurality of unit cells may be arrayed in a first array in an x-y plane, and then a second plurality of unit cells may be arrayed in a second array in a different x-y plane stacked upon the first plurality of unit cells. Each unit cell in a first array may have the same orientation as all other unit cells in the first array. In a second array, each unit cell may also have the same orientation as all other unit cells in the second array, but may have a different orientation from the unit cells in the first array. Accordingly, when fluid flows from outlets in the first stack of unit cells, it may follow a non-straight path to the inlets in the second stack of unit cells.

A zone may comprise an array of the same unit cells in the same orientation, so that the perforations in the unit cells are substantially identical to each other. A perforated structure may comprise a first zone comprising a first array of identical unit cells, and a second zone comprising a second array of identical unit cells, wherein the unit cells in the first array and the second array differ in orientation, size, number of walls, angles of walls, and more.

In certain embodiments, a perforated structure may comprise a first set of perforations that are substantially identical in geometry to one another. Geometry may comprise measures such as size, shape, volume, cross-sectional area, orientation in space, and relative position to neighboring perforations.

Perforated structures may further comprise support structures. FIGS. 6A-6D show example support structures on a perforated structure. FIG. 6A shows a perforated structure 600 comprising a plurality of perforations 601 arrayed in rows. Each perforation 601 extends from a first surface 605 through the perforated structure to a second surface 604. A support structure comprises an array of supports (602a-602e), each contacting the second surface 604 at spaces located between the perforations 601. Each support structure is configured to join a base structure 603. The support structures comprise toothed structures in which only the tooth portion 606 contacts the second surface 604 of the perforated structure.

FIG. 6B shows a perforated structure 610 comprising a support structure 612 at an edge of a mold. The support structure comprises perforations 611. FIG. 6C shows a perforated structure 620 comprising perforations 621 which are dotted throughout the perforated structure. The second surface of the perforated structure 624 is visible. In an array of support structures (622a-622h), each support structure is configured to contact the second surface 624 at a location in between the perforations 621. Each of the support structures (622a-622h) comprises elongated beams that together form a columnar scaffold. The support structures are configured to join a base structure 623. FIG. 6D shows a view of a segment of a perforated structure 630, as viewed from a second surface 634 which will contact a support structure. Perforations 631 are interspersed with non-perforated sections 637, where support structures may contact.

Support structures may provide physical support to the perforated structure when in use, for example, at areas where the perforated structure may be subjected to forces, pressure, and/or stresses. Support structures may be used to facilitate the manufacture of the perforated structure. For example, the perforated structure may need support structures to prevent deformation during additive manufacturing, particularly at overhang areas (e.g., areas that do not have structure directly underneath in the direction of a build platform during manufacturing and where the area is positioned at an angle relative to a build surface that is less than an overhang angle. The overhang angle may depend on the build material and the AM technologies, for example, the overhang angle may be 30 degrees, or may be 45 degrees). Accordingly, the support structures may serve a dual purpose for perforated structures that are made by additive manufacturing, e.g., 3D printed perforated structures. When the perforated structure is used for a purpose such as filtration or molding objects, the support structures may not obstruct the perforations.

Support structures may be configured to contact the perforated structures only in one or more spaces located between perforations, for example, space 637 in FIG. 6D. The support structures may be aligned relative to the perforations in the mold so that they provide maximum support without blocking the perforations from any angle. For example, the support structures may extend away from the second surface of the perforated structure, so that movement of liquid or air is not impeded by the support structures.

In certain embodiments, a perforated structure may be configured for shaping a product from a fiber-based material and may comprise a first surface configured to conform to the product, a second surface, a plurality of perforations, each comprising a first opening at the first surface and a second opening at the second surface, and at least one support structure, wherein the support structure is configured to contact the second surface of the perforated structure only in one or more spaces located between the second openings of the plurality of perforations. The perforated structure may be a one-piece structure.

Example support structures may comprise at least one of a columnar structure, a lattice structure, a wall structure which extends along the second surface (or a portion thereof) of the perforated structure. The support structure may be configured to contact the second surface of the perforated structure in more than one space located between the second openings of the plurality of perforations. In some embodiments, the support structure comprises a wall structure with teeth or serrations, wherein a point on the teeth contacts the second surface of the perforated structure.

Referring to FIG. 6A, a support structure may further comprise an array of support structures 602a-602e, each configured to join a base structure 603. The base structure may be spaced apart from the second surface of the mold, so that the base structure does not obstruct the flow of material through the perforations. In some embodiments, one of the base structure or at least one support structure in the array of support structures may be configured to direct the flow of material, for example, by comprising one or more of channels, angled surfaces, textures, perforations, or other physical features. A support structure may comprise perforations, or may be a solid structure without perforations. A base structure may comprise perforations, or may be a solid structure without perforations.

The perforated structures disclosed herein may be manufactured by additive manufacturing (AM). In AM, objects are built in cross-sectional layers, typically from a build material in a powder, liquid, or extruded molten form. When objects are built in an additive layer-wise manner, challenges which may otherwise arise in traditional subtractive manufacturing methods such as machining may be avoided. For example, the complex networks of perforations and channels in perforated structures may be time-consuming or even impossible to machine, because machining tools may not be able to access all surfaces or carve lattices and open spaces in non-linear paths. In addition, where multiple components made by subtractive manufacturing may need to be joined together to make a perforated structure, AM offers freedom of both design and manufacture for building one-piece perforated structures.

Perforated Structures—Stacked Lattices

Figure 5D:
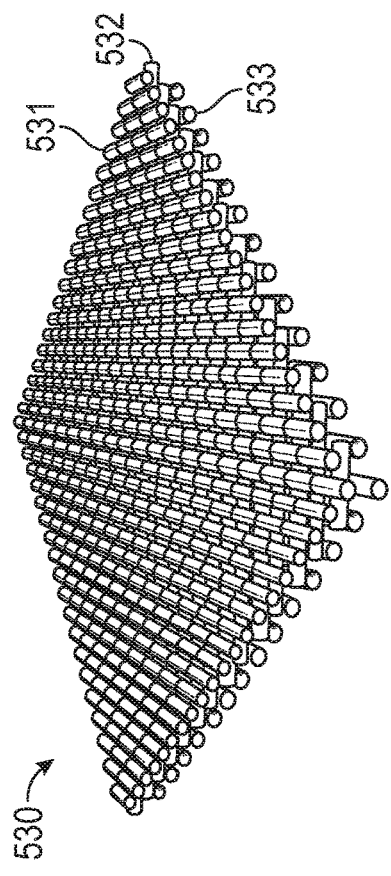

Referring to FIG. 5D, zones in a perforated structure 530 may be arranged in layers, so that a first zone 531 comprises a first set of perforations that differs from a second set of perforations in a second zone 532, wherein the first zone is layered atop the second zone. In such a configuration, at least one perforation in the first set of perforations may partially overlap (or may not overlap at all) with at least one perforation in the second set of perforations. At least one perforation in the first set of perforations may partially overlap a solid portion of the second zone. A material such as a gas or liquid flowing through the first and second set of perforations may follow a non-continuous (or non-straight or non-linear) path. Perforated structure 530 further comprises a third zone 533 layered beneath the second zone 532. In general, perforated structures may comprise a plurality of layered zones.

For perforated structures like molds and insulating structures, air or water should flow freely through perforations, but the path through the perforated structure need not be straight or continuous in a single direction. Indeed, the flow properties of liquid through the perforated structure may be controlled by a non-straight path. The path of fluid flow may change directions at least once, or may continuously change direction as the fluid traverses the perforated structure. The path may follow one or more steps that change direction at an angle, a spiral, a series of non-regular direction changes, or any combination of these.

There are many designs for perforated structures with non-straight fluid paths and additive manufacturing enables fast and flexible construction of the designs. In one method, each layer of the structure is built in regular pattern, and the adjacent layers are offset or rotated relative to layers immediately above and below. The regular pattern may comprise a series of straight lines, where each layer is laid at an orthogonal angle to the layer underneath. The regular pattern may comprise a series of u-shaped structures, or sine waves.

One aspect of the present disclosure relates to a perforated structure having a path for water or air that is not straight or continuous in one direction, e.g., a perforated structure comprising a plurality of cross sections, wherein a cross section: may comprise a different scan pattern than the cross section directly above and below it; and may be rotated at an angle relative to the cross section directly above and directly below it. Each cross section may have a different configuration than the cross section located immediately above or below.

Figure 11D:
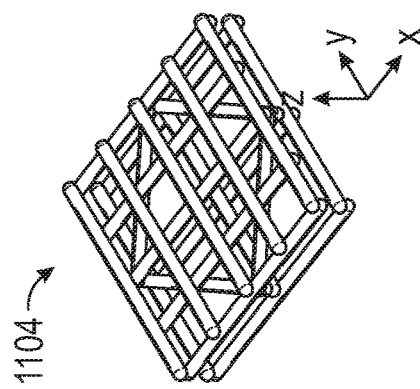
FIGS. 11A-11G show an example perforated structure comprising a stack of lattices.
Figure 11C:
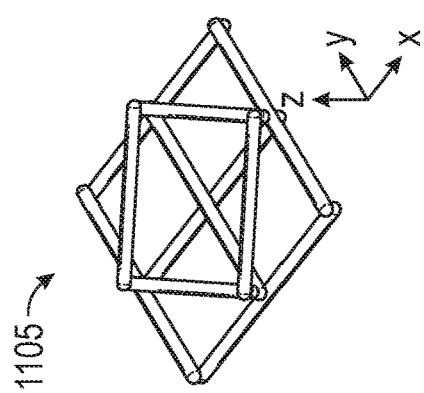
Figure 11B:
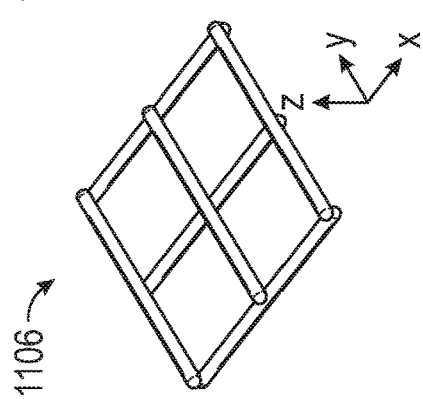
Figure 11G:
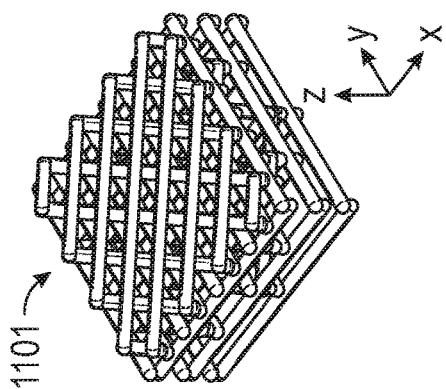
Figure 11F:
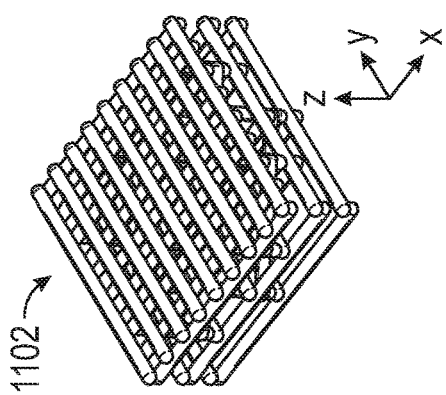
Figure 11E:
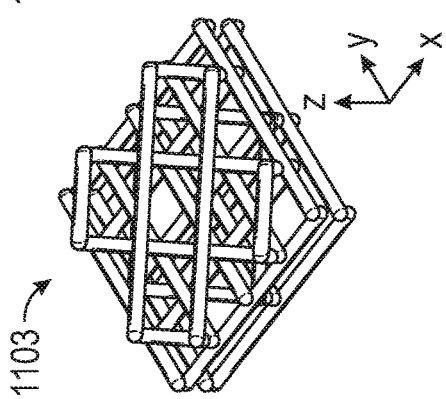
Figure 11A:
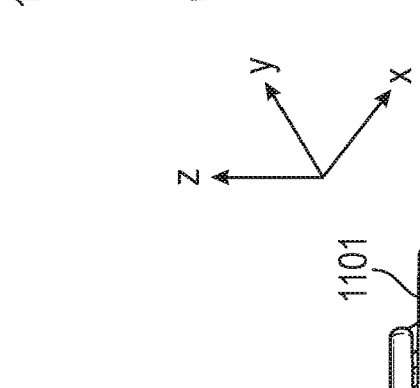

FIGS. 11A-11G show an example perforated structure 1100 comprising a plurality of cross sections, e.g., a stack of lattices, each comprising a plurality of beams. In this example, each cross section comprises a contour pattern that differs from the contour pattern in the cross section above and below. There are six cross sections (e.g. lattices), labeled (1101)-(1106). An array of support structures 1107 is also present in lattice 1106. FIGS. 11B-11G show a view of each lattice, as built on top of lattice(s) below it. Starting at FIG. 11B, lattice 1106 is built. The array of beams in lattice 1106 may be built in the configuration shown, wherein 3 beams are arrayed in a first direction and 3 beams are arrayed in second direction and laid atop. In FIG. 11C, lattice 1105 is built. This simple lattice comprises 4 beams forming an open square shape. In FIG. 11D, lattice 1104 is built, wherein the array of beams has a set of openings that are smaller than the openings in lattice 1103 and also the openings in lattice 1105 (FIG. 11E). FIG. 11F shows lattice 1102, which comprises a larger number of beams than any other lattice in the perforated structure and consequently the smallest openings of all lattices. FIG. 11G shows the final lattice 1101.

Figure 12A:
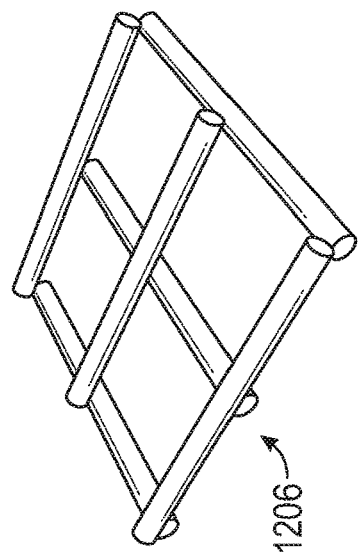
FIGS. 12A-12F show example support structures that may be used to support lattices in a stack.
Figure 12B:
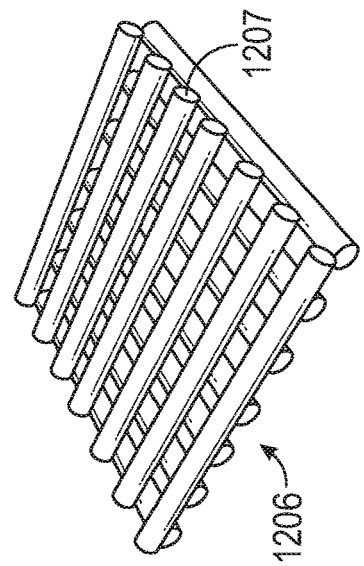
Figure 12C:
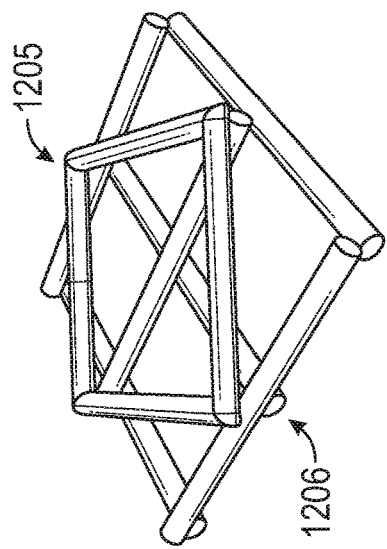
Figure 12D:
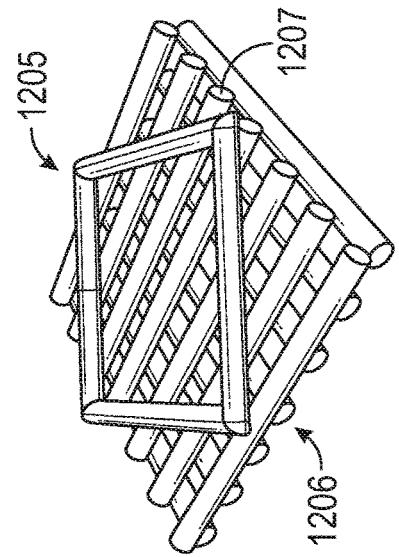
Figure 12E:
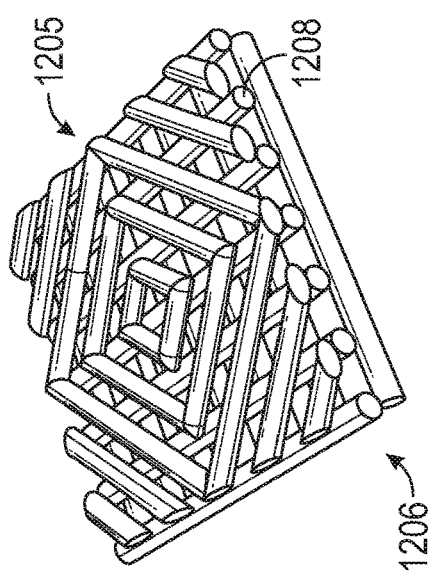
Figure 12F:
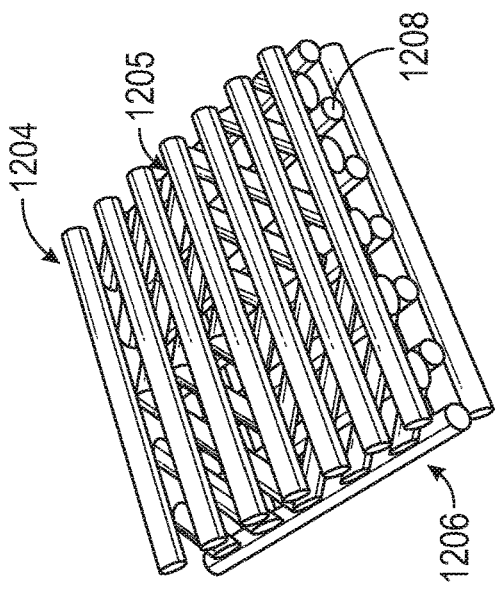

Example support structures are shown in FIGS. 12A-12F. FIG. 12A shows lattice 1206, while FIG. 12C shows lattice 1206 on top of which lattice 1205 is stacked adjacent. FIG. 12B shows lattice 1206 with support structures 1207 within the lattice. FIG. 12D shows how support structures 1207 will support the lattice 1205 at points along the length of its beams. Similarly, lattice 1205 may have support structures 1208 built within the lattice (FIG. 12E). The support structures 1208 are configured to support at points along the length of the beams in lattice 1204, which is shown atop lattice 1205 in FIG. 12F.

In certain embodiments, the cross section (or lattice) having the smallest openings (for example, having the most lines or lines most closely spaced together) may be built first, and each successive cross section with larger openings may be built in order. Accordingly, each cross section may partially or fully support the cross section above it, which reduces or eliminates the need for support structures. In the example in FIG. 11A, the cross sections may be built in order of (1101), (1102), (1103), (1104), (1105), and (1106), and support structures may not be required for one or more of these lattices. In some embodiments, certain lattices may be self-supporting, for example, if the overhanging beams in a lattice are short enough that supports are not required.

A cross section (also called a section or stack, and exemplified by a lattice comprising an array of beams), may comprise one or more cross-sectional layers of a perforated structure that are built on an additive manufacturing (AM) device by an additive manufacturing process. Accordingly, the cross section may correspond to a layer of build material that is extruded during an extrusion-based AM process, or to the layer of build material that is melted, sintered, cured, fused, bound with chemical agents, or otherwise formed into a layer during a powder-based fusion or resin-based AM process. The cross-section may have a thickness of the layer made by AM. In some embodiments, the cross section may correspond to more than one cross-sectional layer as built by an additive manufacturing process. In some embodiments, a cross section comprises a plurality of cross-sectional layers, and has a thickness of the plurality of cross-sectional layers. In some embodiments, a cross section, comprising either a single cross-sectional layer thickness or comprising a plurality of cross-sectional layers, is configured in a geometric shape such as a square, circle, or polyhedron. In certain embodiments, the geometric shape is a lattice (also called a grid, mesh, matrix, or network).

Accordingly, a perforated structure configured to direct material along a non-linear path may comprise a plurality of lattices arranged in a stack and comprising a first lattice comprising a first array of beams configured to form at least one first open space, and a second lattice comprising a second array of beams configured to form at least one second open space, wherein the first and second lattice are adjacent to each other, and wherein the first array of beams has a different configuration from the second array of beams, and wherein the at least one first open space partially overlaps a portion of the second array of beams. The perforated structure may be a one-piece structure.

In the perforated structure, the first and second lattice may be configured to direct material through the at least one first open space and around the portion of the second array of beams.

In some embodiments, the at least one first open space is located in a first surface of the perforated structure and is configured as an inlet perforation to the perforated structure. The at least one second open space may be configured to act as an outlet perforation.

Accordingly, a gas or liquid may enter the perforated structure through the at least one first open space, then contact and flow around the portion of the second array of beams, and then exit the first and second lattice through the at least one second open space. In a perforated structure with only a first lattice and a second lattice, the material may exit the perforated structure through the at least one second open space.

Alternatively, the material may move further through the perforated structure after flowing through the at least one second open space. In some embodiments, a perforated structure may further comprise at least a third lattice comprising a third array of beams configured to form at least one open space, wherein the third lattice is adjacent to the second lattice, and wherein the third array of beams has a different configuration from the second array of beams, and wherein the at least one second open space partially overlaps a portion of the third array of beams.

Perforated structures may further comprise n additional lattices (e.g., where n is a positive integer), wherein each of the n additional lattices has an array of beams configured to form at least one open space, and wherein each adjacent lattice comprises an array of beams that has a different configuration from the array of beams in one or more adjacent lattices in the stack, and wherein the at least one open space in each lattice partially overlaps a portion of the array of beams in the one or more adjacent lattices in the stack. The nth additional lattice may comprise at least one nth open space that is configured as an outlet perforation to the perforated structure.

In general, an nth additional lattice may be located on a surface of the perforated structure that is not the same surface on which the first lattice is located. For example, the nth additional lattice may be at a side opposite to the first lattice, such as the bottom surface where the first lattice is located on the top surface of the perforated structure. In some embodiments, the plurality of lattices may be arranged in a vertical stack.

A non-linear path in a perforated structure may comprise a path following at least one of a series of steps that change direction at an angle, a spiral, and a series of non-regular direction changes. Lattices in the perforated structure may be configured to create the path, for example, to control the speed or direction that the material flows through.

The first and the second lattice may comprise a variety of configurations. In some embodiments, the first lattice and the second lattice each comprise a border formed by beams. At least one of the first and second arrays of beams may comprise a patterned array of beams. For example, a patterned array may comprise a grid. In certain embodiments, at least one of the first and second arrays of beams comprises at least one beam oriented in a first direction and at least one beam orientated in a second direction. The first direction and the second directions may be orthogonal to each other.

At least one of the first and second arrays of beams may comprise at least a first beam laid across at least a second beam. For example, a first array of beams in a first lattice may comprise an upper beam laid upon and/or across a lower beam. Such a first array of beams may have an overall height (or thickness) that is the sum of the thickness of the upper beam plus the lower beam. In some embodiments, the upper beam and lower beam may be configured in the same plane as one another, so the overall height of the first array of beams is equivalent to height of the taller (or thicker) of the upper and lower beams.

At least one of the first and second arrays of beams may comprise two or more beams joined to each other at nodes. A node (also called connection point or contact point) between the beams may be the point where the beams in the array contact each other. A node may be the contact point between the upper beam and the lower beam in a first array of beams. A node may be point at which the ends of two beams in the array contact each other. Two or more beams may be joined at their ends to form a single open space. For example, two or more curved beams may form a circular or elliptical open space. Three or more straight beams may form a polygonal open space. Four straight beams may be configured end to end to form a square. Beams may be curved, straight, angled, or a combination of all of these. Curved beams and straight beams may be combined in an array of beams.

Beams having different sizes, lengths, widths, cross-sectional thicknesses or heights, geometries, and curvatures may be combined in an array. At least one beam in the array of beams may be an elongated structure such as a column, a pillar, or a block. The cross section of the at least one beam may be a geometric shape such as a circle, an ellipse, a square, a rectangle, or polyhedron. A beam may have a planar shape, such as a thin wall or a flat sheet, and may be configured to lie on its thin edge or on its largest surface. A beam may be elongated in two or more planes. A beam may comprise at least one portion that is straight, curved, twisted around an axis, bent, or angled relative to another portion of the same beam.

The first array of beams may have a different configuration than a second array of beams. The arrays of beams may differ from one another in one or more of a number of beams in the array, rotation of the array of beams with respect to a central axis through the stack of lattices, and size of the open space between the beams. In an example embodiment, at least one first open space may be larger than the at least one second open space. All of the first open spaces may be larger than all of the second open spaces. Where a perforated structure comprises more than two lattices, each lattice may comprise at least one open space that is larger or smaller than the lattice immediately adjacent in the stack.

A perforated structure may further comprise one or more support structures configured to support at least one of the first lattice and the second lattice. These support structures may be required for some perforated structures that are built by AM processes, in order to avoid deformation where a lattice or beam in a lattice are not self-supporting or are not supported by any other support structure. Support structures may be configured in the same pattern as the lattice they support, so that all points on the lattice are supported, or support may be configured to support the lattice at intervals. In some embodiments, where a first lattice is stacked upon a second lattice, one or more support structures may be configured to support the first lattice, and the one or more support structures may be located within the second lattice. The support structures may be part of the second lattice, or may be additional structures that are not part of the second lattice. Additional structures may be removed before the perforated structure is used.

In some embodiments, the support structures may be constructed from a different material than the cross sections of the perforated structure. For example, in extrusion-based additive manufacturing methods, more than one material may be used to build different parts of an object, or to build an object having supports of a different material. The material used to build the support structures may be more soluble than the material used to build the object, or may have a lower melting temperature. Accordingly, the support material may be dissolved in a solvent or melted off the object at a temperature that leaves the object fully intact.

A further aspect of the present disclosure relates to a method for manufacturing a perforated structure that is configured to direct material along a non-linear path. In some embodiments, the method may comprise receiving, in a computing device, outer dimensions of the perforated structure, and geometries of a plurality of lattices; and manufacturing, in an additive manufacturing device, the plurality of lattices, wherein the plurality of lattices is arranged in a stack and comprises a first lattice comprising a first array of beams configured to form at least one first open space, and a second lattice comprising a second array of beams configured to form at least one second open space, wherein the first and second lattice are adjacent to each other, and wherein the first array of beams has a different configuration from the second array of beams, and wherein the at least one first open space partially overlaps a portion of the second array of beams.

The method may further comprise the steps of scanning the first array of beams, and scanning the second array of beams. In some embodiments, the method may comprise scanning one or more support structures configured to support the first array of beams. The one or more support structures may comprise a different material than the first and second array of beams.

Scanning may comprise building cross-sectional layers of a beam by moving an extruder containing build material or by applying either an energy source or chemicals to a build material along a scan pattern. Scan patterns may comprise at least one of a contour, hatch, outline, corner, fill, jump, or other feature of the cross-sectional layer built by AM. In some embodiments, scan patterns may vary in at least one of the number of hatch lines, the space between hatch lines, the shape of the overall scan pattern, and more.

Every cross section (e.g., a lattice comprising an array of beams) in the perforated structure may vary in scan pattern and orientation from the cross sections immediately underlying and overlying it. Alternatively, in some embodiments, every two or more adjacent cross sections may have the same scan pattern and orientation as each other, while the next cross section in the z direction (either immediately underlying or overlying) has a different scan pattern and orientation. Two or more cross sections may form a stack of cross sections, so that variation arises between stacks but not between individual cross sections.

Any combination of cross sections or stacks of cross sections may be configured in either a random or non-random pattern in which the combination of different scan patterns and different orientations collectively lead to in a variation in perforations. This variation thereby results in a path for water or air that may comprise direction changes at an angle, a spiral, a series of non-regular direction changes, or any combination of these.

In the cross sections of the perforated structure, variation in scan patterns between cross sections may comprise variation in length of lines, number of lines, spacing between lines, thickness of lines, pattern in a cross section, geometric shapes traced by scan patterns, orientation, and/or more.

Perforated Structures—Molds

The molds used for shaping products from fiber-based materials are an example of perforated structures where the flow of material may be controlled through perforations across a variety of shapes. Molds are used for pressing or forming products, often limited-use products, out of a raw material comprising a fiber-based material such as paper pulp or cellulose fluff. As the use of products made from fiber-based materials grows, so does the complexity of functions these products perform, and features such as absorbency, cushioning, conformal fit, and more are constantly improving. Molds for fiber-based products evolves in parallel. Recently, one-piece molds have been used to replace traditional machined forms and conformal screens (the screen-and-mold system), and some have been produced by AM. However, the designs and methods of manufacturing may not be optimized for molds with complex geometries, particularly where the fiber-based material may be formed in a uniform layer across differently-shaped structures, or where the fiber-based material may be formed in a non-uniform layer across a single structure. Described herein are molds and methods for manufacturing molds, for example, by additive manufacturing (AM). In some embodiments, molds may mimic the function of a traditional screen-and-mesh system. In certain embodiments, perforations in the mold may be created using an AM infill strategy, whereby a section (e.g., a solid section) of the perforated structure is filled with material and perforations are generated as part of the build slicing process.

One aspect of the present disclosure relates to a mold configured for shaping a product from a fiber-based material, comprising a plurality of perforations each configured to contact the fiber-based material, wherein the plurality of perforations comprise a first set of perforations substantially identical to one another configured in a first zone on the mold; and a second set of perforations substantially identical to one another configured in a second zone on the mold, wherein the first set of perforations differs from the second set of perforations in at least one of number of perforations, spacing between perforations, and geometry of perforations, and wherein the first zone and the second zone together are at least in part configured to form a shape that is conformal to the product. In some embodiments, the mold is a one-piece structure.

As the first zone and the second zone may be together at least in part configured to form a shape that is conformal to the product, the first and second zone may be located adjacent to one another. In some embodiments, the first zone and the second zone are configured to share a common border. The first zone and the second zone may each be layers in the perforated structure. The first zone may be positioned in a different plane than the second zone, for example, the first zone may rest atop the second zone, or vice versa.

In certain embodiments, the zones correspond to protrusions on the mold. Protrusions such as conical shapes or jutting edges are commonly used to mold products which incorporate protrusions in their designs. Molded products such as egg cartons, for example, may comprise cups configured to hold eggs and protruding columns configured to position the eggs and prevent contact with each other. The protruding columns in egg cartons may also be configured to aid in spacing the egg cartons apart during production and assembly.

Some molded products have channels that open to the surface of the product and run along the area of the product. These products require a mold with one or more protrusions that correspond to the channels. The protrusions may have non-linear contours, jagged edges, or other characteristics which will create channels with desired properties.

The steps of manufacturing a mold with protrusions may be simplified with one-piece mold structures. Using a traditional screen-and-mold process, it may be impractical to fit a conformal screen over the protrusions, particularly if they are spaced close together or have thin walls that must be accessed from opposite sides. One piece molds may eliminate the need for a screen, and AM provides the design flexibility to build walls or protrusions in the mold. However, drawing raw material along the protrusions in the mold may be challenging because a stronger suction or air pressure is required to deposit and/or accumulate raw material around protrusions than is required to bring material into a flat part of the product.

Accordingly, where a first zone corresponds to a protrusion on the mold where more air pressure and/or water pressure is required to place raw material, and a second zone corresponds to a flat part of the mold, the first zone may have comprise a first set of perforations that differs from a second set of perforations in the second mold. The first set of perforations may be greater in frequency, size, and/or spacing between perforations than the second set. The first zone (protrusion) may have an increased percentage of its surface area covered with perforations, and/or may have larger perforations than the remainder of the mold that corresponds to the second zone (flat, non-protruding portion) of the product.

The design of the mold may incorporate the variable perforations in different zones of the mold. In some embodiments, the placement of perforations may be optimized by calculating air or water pressure needed to place material at each part of the mold and then spacing the perforations so each part will receive the appropriate effective pressure, even though a single uniform air or water pressure may be applied to the entire surface of the mold.

In some embodiments, a first set of perforations in a first zone that is a protrusion may be smaller in frequency, size, and/or spacing between the perforations than a second set of perforations in a second zone that is not a protrusion. For example, the second zone may be a side support zone. Small amounts of raw material may slip into the first set of perforations and may need to be washed out of the mold in order to prevent accumulation of raw material and clogging. The second set of perforations in the side support zone may be configured to be larger than other perforations, in order to accommodate flushing of raw material out of the mold.

FIGS. 7A-7C show an example of differences between perforations in zones corresponding to protrusions. FIG. 7A shows a segment of a perforated structure having a first set of perforations (such as perforation 702) in a first zone 701 that corresponds to a protrusion, as compared to a second set of perforations (such as perforation 704) in a second zone 703 that corresponds to a flat area of the perforated structure. In addition, a third set of perforations (such as perforation 706) is present in a third zone 705 that corresponds to a curved wall on the perforated structure. The first set of perforations in the first zone are larger than the second set of perforations in the second zone and larger than the third set of perforations in the third zone. In FIGS. 7B and 7C, a first set of perforations in a first zone (zone 711 in FIG. 7B or zone 721 in FIG. 7C) that corresponds to a protrusion are smaller than a second set of perforations (such as perforation 713 in FIG. 7B or perforation 723 in FIG. 7C) in a second zone (zone 712 in FIG. 7B or zone 722 in FIG. 7C) that corresponds to a side support structure.

In certain embodiments, zones may be located beside one another, for example, the zones may share a border. The zones may all lie in the same plane. In some embodiments, at least one opening of a perforation in a first zone is in the same plane as at least one opening of a perforation in a second zone. Molds may have a uniform thickness (e.g., height), such that a straight line measured from a first surface to a second surface of the mold is the same. Perforations across a uniform thickness may have the same dimensions, even if the perforations are in different zones. Alternatively, a first zone may comprise perforations with a linear path, while a second zone may comprises perforations with a non-linear path. Molds may have a non-uniform thickness (e.g., height), in which case zones beside each other along the length of this mold may not lie in the same plane as one another.

Molds may comprise zones corresponding to complex shapes of the products formed on the mold. Products (e.g., objects) such as feminine hygiene products and diapers often have a non-homogeneous shape, due to a variety of shape elements in the object like channels, contours, surface textures, and/or regions of variable height or geometry. Shape elements may be important for ensuring that the object has the optimal absorbency, distribution of fluid, flexibility, and/or more. However, when manufacturing an object with shape elements in a mold, the zones corresponding to the shape elements may collect material unevenly during manufacture, due to the irregular shape and variable volume of these zones. In the resulting object, material may be too densely packed or not densely packed enough in the shape elements, resulting in poor function of the object. Unfortunately, traditional manufacturing methods, using a mold with a mesh screen and suction, cannot be easily adapted to control the accumulation of material at the shape elements.

Accordingly, the mold may comprise at least a first zone and a second zone that are each configured to produce an object having a first region and a second region with different physical and/or functional properties than one another. The zones of the mold may differ from one another in height, thickness, amount of material, shape, and more, so that regions on an object made from the mold differ from one another in absorbency, ability to distribute fluid, flexibility, and/or more. The zones in the mold may be divided by physical barrier (also called border or border structure), wherein the physical barrier may be a shape element such as a channel or a wall. The physical barrier may have perforations that are distinct from the zones it separates. The zones in the mold may border one another without a physical barrier such as a shape element.

Figure 9D:
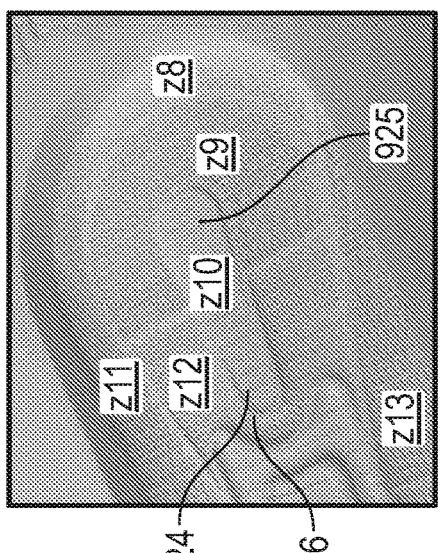
FIGS. 9A-9E show example zones on mold.
Figure 9C:
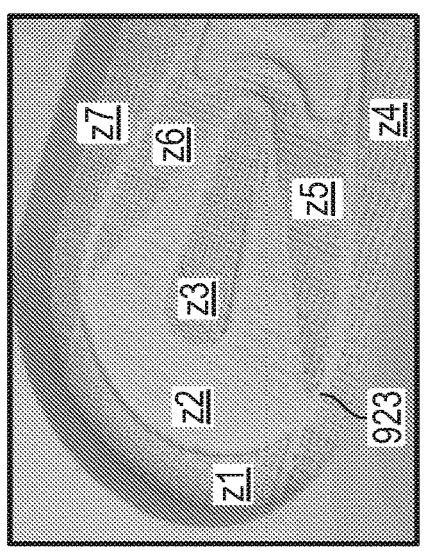
Figure 9E:
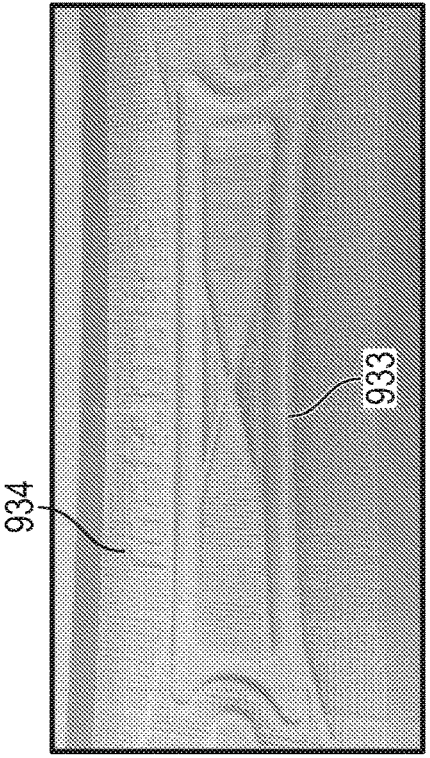
Figure 9A:
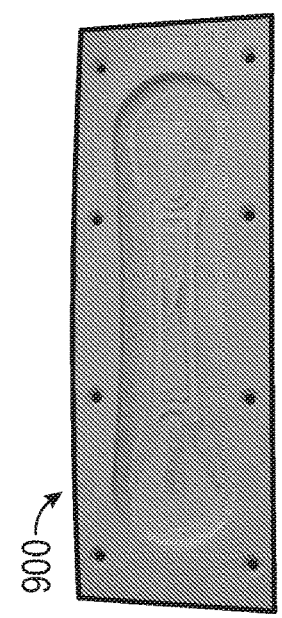
Figure 9B:
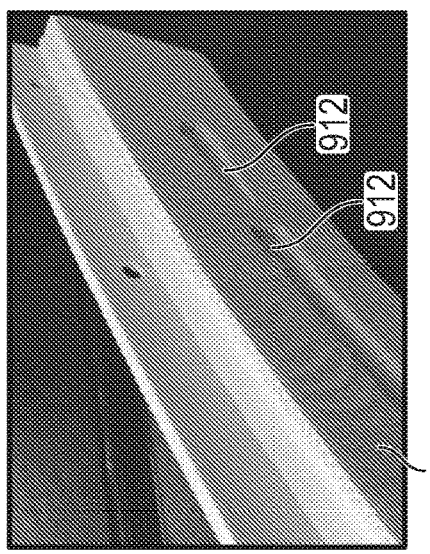

FIGS. 9A-9E show an example mold having zones located beside another, wherein the zones and perforations are configured to regulate the accumulation of raw material across the mold. FIG. 9A shows a view of the entire mold 900, on the A side, which will contact the raw material. FIG. 9B shows a partial view of the reverse side (B side) of the mold, where both perforations 911 and grooves 912 are present. FIGS. 9C and 9D show close-up views of the ends of mold 900. In each, distinct zones comprising sets of perforations are visible (labeled z1-z7 in FIG. 9C and z8-z13 in FIG. 9D). In FIG. 9C, a physical border 923 separates zones z4 and z5. Either zones or borders may vary in thickness. In FIG. 9D, zone z10 is thinner at one end 924 than at another end 925, while border 926 is thicker in a region near to end 924 and thinner in a region near to end 925. FIG. 9E shows a thick border 933 and a pattern 934 of letters spelling "materialise" in perforations.

Figure 10A:
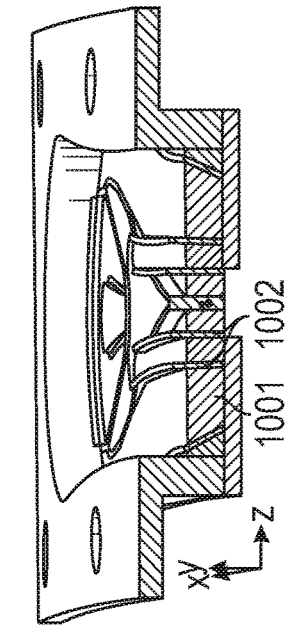
FIGS. 10A-10C show example height differences in zones on a mold.
Figure 10B:
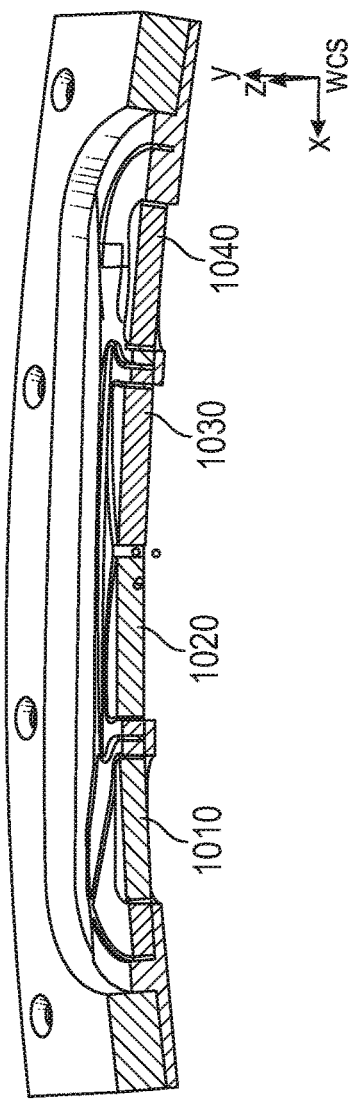
Figure 10C:
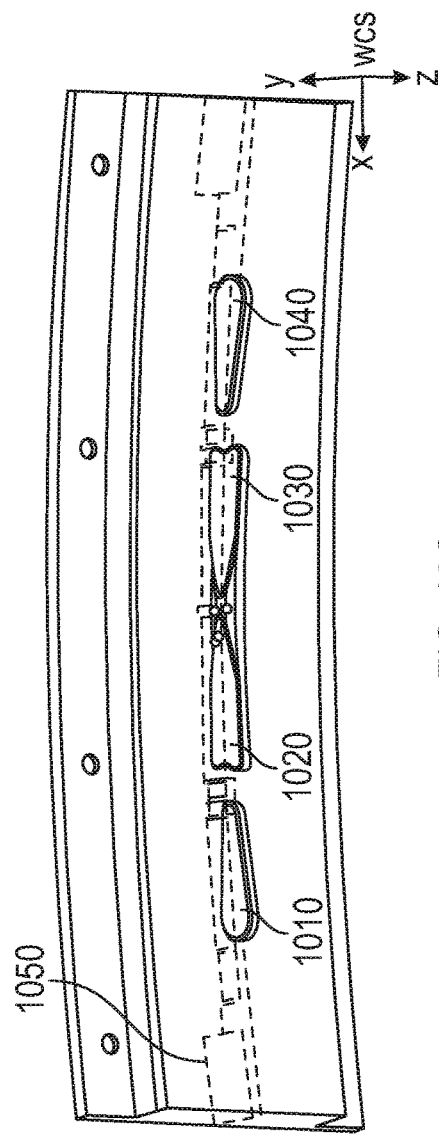

Variable thicknesses in zones and borders in the mold are further illustrated in FIGS. 10A-10C. FIG. 10A shows the same end of the mold as FIG. 9C, viewed as a cross section. Height differences are visible between a zone 1001 and borders 1002. In FIG. 10B, the mold is cut in half and viewed from the side. Zones 1010, 1020, 1030, and 1040 differ in height. In FIG. 10C, a cutaway view of the B side of the mold is shown. The outline drawing 1050 shows the height and shape of the outermost surface of the B side, which has been cut away, while the B sides of zones 1010, 1020, 1030, and 1040 are visible.

The zones of the mold may be configured to accumulate material in a controlled manner. In some embodiments, the accumulation of material is non-uniform. For example, a first zone on the mold may correspond to a first region on the object where the material will be denser than other regions on the mold. Accordingly, at least one of the perforation size in the first zone, the density of perforations in the first zone, or the strength of the suction used on the first zone will be different than other zones.

The distribution of perforations may be determined by the density of material present in each region of the product. A higher frequency of perforations or larger perforations may correspond to regions of the product where a higher density of material will be present. For example, regions of the product may use material in higher density in order to confer extra strength or absorbency or other properties. To make these regions, the mold can have extra perforations or larger perforations in areas corresponding to the regions, so that additional material is placed in these areas of the mold.

In some embodiments, the accumulation of material in a first zone and a second zone is uniform. A first zone and a second zone on the mold may physically differ from one another, but may be configured to accumulate material in a uniform manner, i.e., the zones may have the same amount of material as each other and/or may accumulate material to achieve a uniform density over both zones. For example, the first zone and the second zone may differ from one another in area, so that the first zone may be larger in area than the second zone. The first zone may be taller or thicker than the second zone. In some embodiments, the perforations in the first zone may be smaller than the perforation in the second zone, ensuring that equal amounts of material will accumulate in each zone and/or the material will be evenly distributed over the unequal areas to result in a uniform density. In some embodiments, the first zone and the second zone may have the same sized perforations, but the first zone may have fewer perforations than the second zone. In certain embodiments, the first zone and the second zone may have the same sized perforations, but a different suction may be applied over the first zone and the second zone.

In some embodiments, a pattern in the mold may be configured to create a surface texture on the object. A pattern may have a different height than the zone in which it is contained. Moreover, if a pattern is contained within a zone, then the perforations in the pattern may differ from the perforations in the zone by at least one of size, shape, distribution, or exposure to suction.

Perforations in Molds

In the molds as disclosed herein, perforations may be configured to optimize passage of gas or liquid, while restricting passage of raw materials. In some embodiments, the mold comprises a plurality of perforations, each perforation of the plurality of perforations comprises a first opening that contacts a fiber-based material and a second opening. The first and the second openings may be separated by a space. FIGS. 8A-8G show example pore designs. FIG. 8A shows a perforated structure 800 comprising a perforation in which a first opening 801 and second opening 802 are circular, and the first opening comprises a first circular opening that is larger in cross-sectional area than the second circular opening. FIG. 8B shows perforated structure 810 comprising a perforation in which a first opening 811 and a second opening 812 are hexagonal. The first and second openings may have any geometric shape, and may have the same geometric shape as one another, or may have a different geometric shape. A perforation may have a non-straight portion between the first and second opening, for example, a branched structure, a spiral, and/or angled steps. In some embodiments, a perforation may comprise more than two openings, such as a third opening located in between the first and the second opening.

While the first and the second openings may each be configured to allow gas and/or liquid to pass through the first and second openings, at least one of the first and the second openings may be configured to restrict fiber-based material from passing through. In some embodiments, the first opening is larger than the second opening.

Perforations in a mold may be configured to reduce clogging of the molds with raw material. Clogging or blockage may result in a loss of time during production, as a production line may need to be stopped in order to retrieve and clean the blocked mold. Traditional screen-and-mold systems comprising mesh screens may exacerbate the problem, as fragments of raw material may be pulled through holes in the screen along with air. Raw materials like shredded paper compress when they pass through the holes, but expand in areas on the opposite side of the screen. When the product is removed from the screen, the expanded fragments of raw material on the opposite side of the screen may be torn as they pass back through the holes. If the fragments remain connected to the product, they create a jagged surface on the product. If the fragments detach from the product, they remain in or around the holes of the screen and create blockages.

In contrast, one-piece molds may comprise perforations that are configured to permit water or air to flow, while minimizing the risk of tearing raw material. For example, a perforation with a tapered shape like a funnel may be used, wherein an opening on the side that will contact the raw material is larger than the opening on the side where the air or water will flow out of the opening. In such a perforation, any raw material drawn into the pore will be smaller at one end and will not tear when the product is removed from the mold.

The openings to the perforations may have any shape: round, square, hexagonal, triangular, polygonal. Perforations may comprise a first shape at the first opening and a second shape at the second opening. Geometry of the perforations may be optimized for material, air or water flow, and/or for AM. Volumes of material and/or gas or liquid that a perforation may contain (also called pore volume) may be configured to be large enough to accommodate the air or water and any fragments of material pulled into the perforation. Volumes of the perforations may be changed by adjusting the height and width and slope of the pore walls. Walls of the perforations may be thick enough to withstand pressures exerted. Together, the walls may also contribute to the overall strength of the mold. Properties can be optimized by changing the dimensions of the perforations.

Other adjustments to the funnel shape of the perforations may include but are not limited to the diameter of either or both openings, the length of the funnel stem, height of the perforation. The length of the entire funnel structure may be determined by the wall thickness of mold, which can be configured for the rate or distance that the raw material will traverse. For example, a raw material may be pulled via suction through the hole to a certain breaking distance at which a piece of the raw material will break off and form a blockage in the perforation. The length of funnel stem and width of funnel may be configured to accommodate a distance that is less than the breaking distance.

Additive Manufacturing Systems

Figure 1:
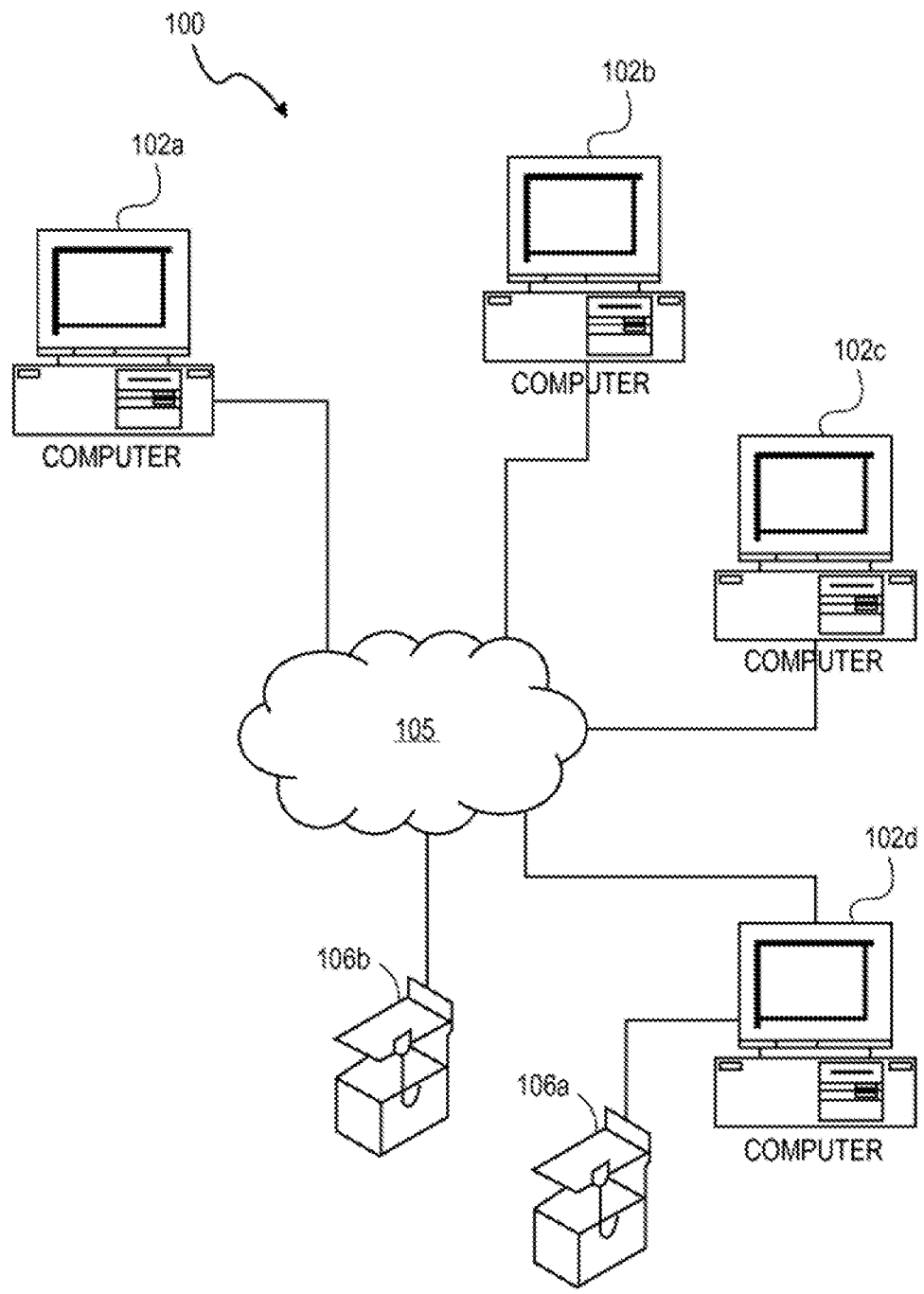
FIG. 1 illustrates an example of a computer environment suitable for the implementation of 3D object design and manufacturing.

Embodiments of the invention may be practiced within a system for designing and manufacturing 3D objects. Turning to FIG. 1, an example of a computer environment suitable for the implementation of 3D object design and manufacturing is shown. The environment includes a system 100. The system 100 includes one or more computers 102a-102d, which can be, for example, any workstation, server, or other computing device capable of processing information. In some aspects, each of the computers 102a-102d can be connected, by any suitable communications technology (e.g., an internet protocol), to a network 105 (e.g., the Internet). Accordingly, the computers 102a-102d may transmit and receive information (e.g., software, digital representations of 3-D objects, commands or instructions to operate an additive manufacturing device, etc.) between each other via the network 105.

The system 100 further includes one or more additive manufacturing devices or apparatuses (e.g., 3-D printers) 106a-106b. As shown the additive manufacturing device 106a is directly connected to a computer 102d (and through computer 102d connected to computers 102a-102c via the network 105) and additive manufacturing device 106b is connected to the computers 102a-102d via the network 105. Accordingly, one of skill in the art will understand that an additive manufacturing device 106 may be directly connected to a computer 102, connected to a computer 102 via a network 105, and/or connected to a computer 102 via another computer 102 and the network 105.

It should be noted that though the system 100 is described with respect to a network and one or more computers, the techniques described herein also apply to a single computer 102, which may be directly connected to an additive manufacturing device 106.

Figure 2:
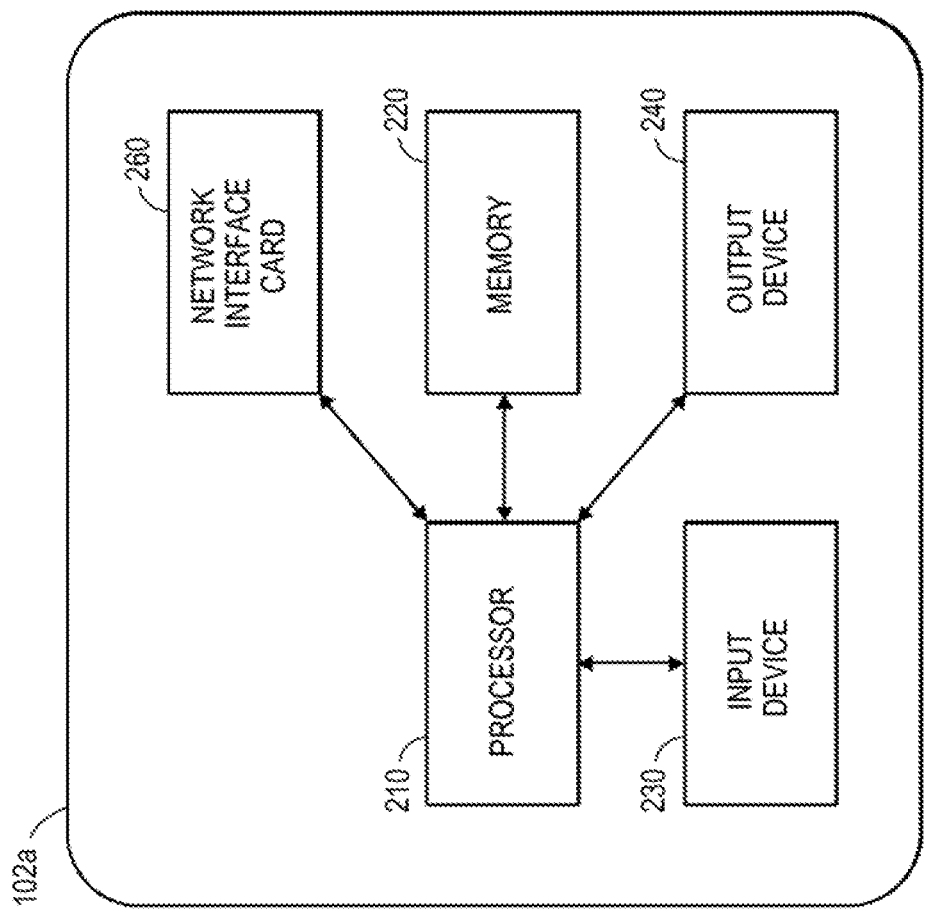
FIG. 2 illustrates an example functional block diagram of one example of a computer.

FIG. 2 illustrates a functional block diagram of one example of a computer of FIG. 1. The computer 102a includes a processor 210 in data communication with a memory 220, an input device 230, and an output device 240. In some embodiments, the processor is further in data communication with an optional network interface card 260. Although described separately, it is to be appreciated that functional blocks described with respect to the computer 102a need not be separate structural elements. For example, the processor 210 and memory 220 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 also may be coupled to an input device 230 and an output device 240 for, respectively, receiving input from and providing output to a user of the computer 102a.

Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 210 further may be coupled to a network interface card 260. The network interface card 260 prepares data generated by the processor 210 for transmission via a network according to one or more data transmission protocols. The network interface card 260 also decodes data received via a network according to one or more data transmission protocols. The network interface card 260 can include a transmitter, receiver, or both. In other embodiments, the transmitter and receiver can be two separate components. The network interface card 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
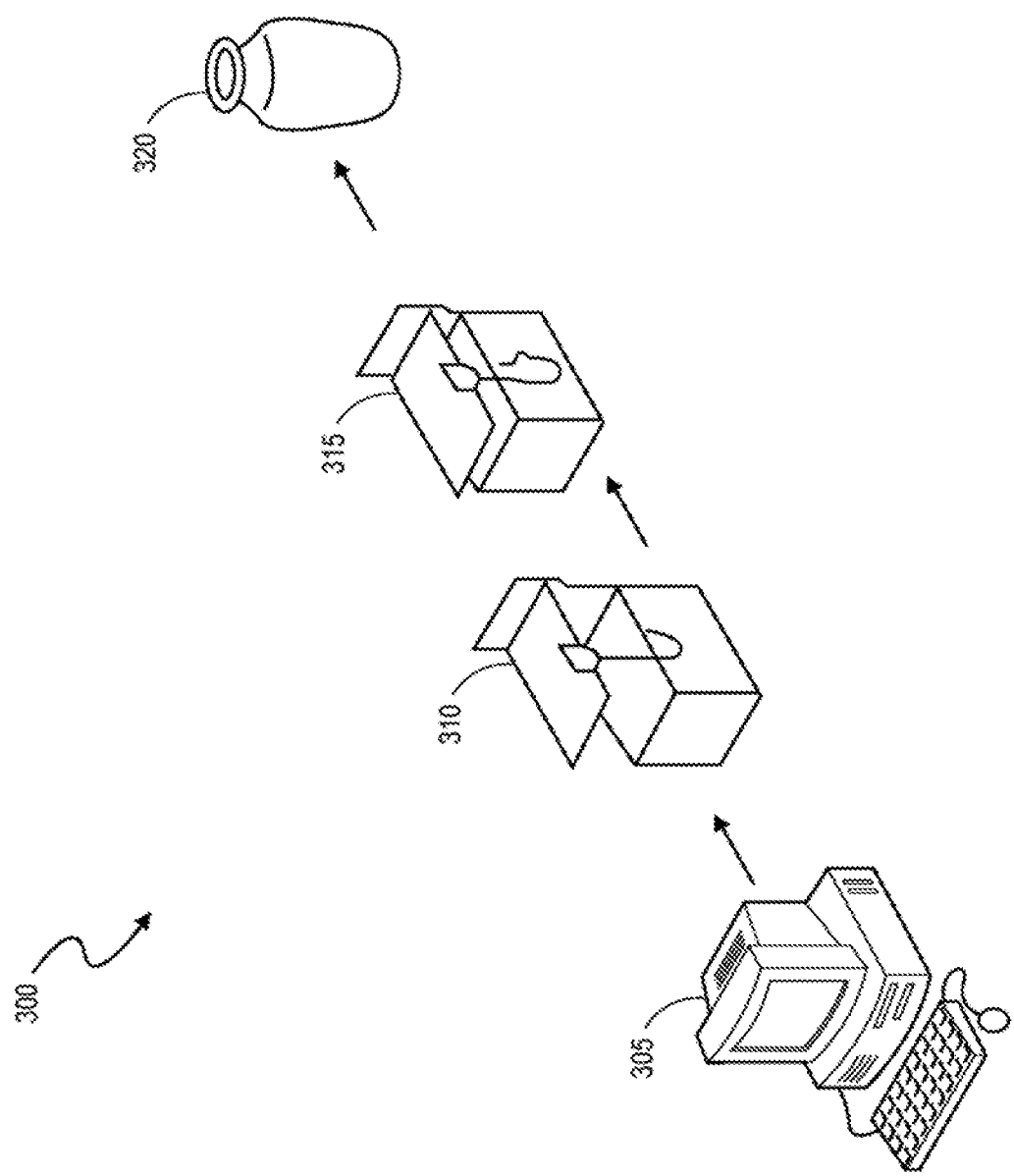
FIG. 3 shows an example high level process for manufacturing a 3D object using the methods and systems disclosed herein.

FIG. 3 illustrates a process 300 for manufacturing a 3-D object or device. As shown, at a step 305, a digital representation of the object is designed using a computer, such as the computer 102a. For example, 2-D or 3-D data may be input to the computer 102a for aiding in designing the digital representation of the 3-D object. Continuing at a step 310, information is sent from the computer 102a to an additive manufacturing device, such as additive manufacturing device 106, and the device 106 commences the manufacturing process in accordance with the received information. At a step 315, the additive manufacturing device 106 continues manufacturing the 3-D object using suitable materials, such as a liquid resin.

These suitable materials may include, but are not limited to a photopolymer resin, polyurethane, methyl methacrylate-acrylonitrile-butadiene-styrene copolymer, resorbable materials such as polymer-ceramic composites, etc. Examples of commercially available materials are: DSM Somos® series of materials 7100, 8100, 9100, 9420, 10100, 11100, 12110, 14120 and 15100 from DSM Somos; ABSplus-P430, ABSi, ABS-ESDI, ABS-M30, ABS-M30i, PC-ABS, PC ISO, PC, ULTEM 9085, PPSF and PPSU materials from Stratasys; Accura Plastic, DuraForm, CastForm, Laserform and VisiJet line of materials from 3-Systems; the PA line of materials, PrimeCast and PrimePart materials and Alumide and CarbonMide from EOS GmbH. The VisiJet line of materials from 3-Systems may include Visijet Flex, Visijet Tough, Visijet Clear, Visijet HiTemp, Visijet e-stone, Visijet Black, Visijet Jewel, Visijet FTI, etc. Examples of other materials may include Objet materials, such as Objet Fullcure, Objet Veroclear, Objet Digital Materials, Objet Duruswhite, Objet Tangoblack, Objet Tangoplus, Objet Tangoblackplus, etc. Another example of materials may include materials from the Renshape 5000 and 7800 series. Further, at a step 320, the 3-D object is generated.

Figure 4:
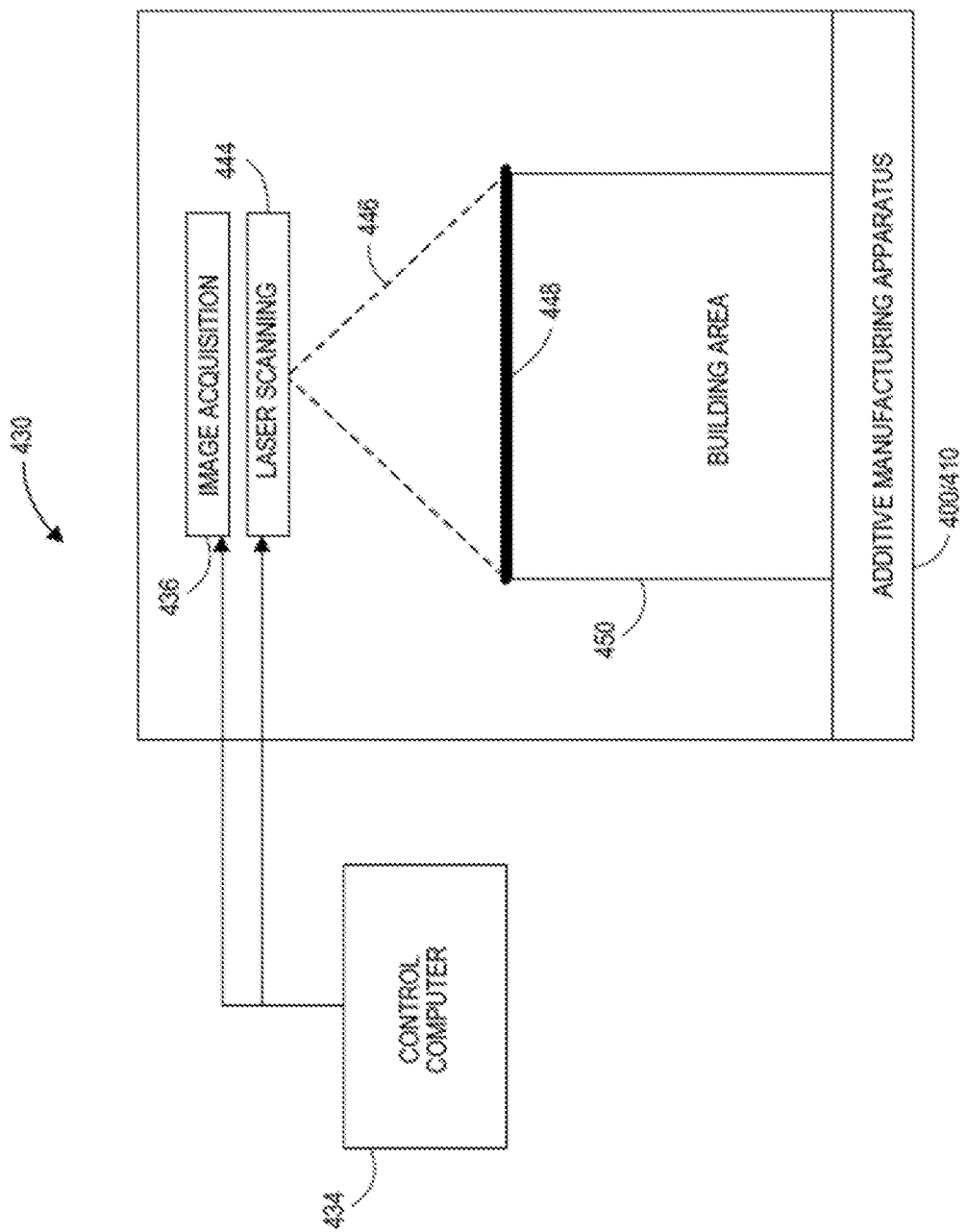
FIG. 4 is an example of a scanning system which may be calibrated using the methods and systems disclosed herein.

FIG. 4 illustrates an example additive manufacturing apparatus 400 for generating a three-dimensional (3-D) object. In this example, the additive manufacturing apparatus 400 is a laser sintering device. The laser sintering device 400 may be used to generate one or more 3D objects layer by layer. The laser sintering device 400, for example, may utilize a powder (e.g., metal, polymer, etc.), to build an object a layer at a time as part of a build process.

Successive powder layers are spread on top of each other using, for example, a recoating mechanism (e.g., a recoater blade, drum, or roller). The recoating mechanism deposits powder for a layer as it moves across the build area, for example in the direction shown, or in the opposite direction if the recoating mechanism is starting from the other side of the build area, such as for another layer of the build. After deposition, a computer-controlled CO2 laser beam scans the surface and selectively binds together the powder particles of the corresponding cross section of the product. In some embodiments, the laser scanning device is an X-Y moveable infrared laser source. As such, the laser source can be moved along an X axis and along a Y axis in order to direct its beam to a specific location of the top most layer of powder. Alternatively, in some embodiments, the laser scanning device may comprise a laser scanner which receives a laser beam from a stationary laser source, and deflects it over moveable mirrors to direct the beam to a specified location in the working area of the device. During laser exposure, the powder temperature rises above the material (e.g., glass, polymer, metal) transition point after which adjacent particles flow together to create the 3D object. The device 400 may also optionally include a radiation heater (e.g., an infrared lamp) and/or atmosphere control device. The radiation heater may be used to preheat the powder between the recoating of a new powder layer and the scanning of that layer. In some embodiments, the radiation heater may be omitted. The atmosphere control device may be used throughout the process to avoid undesired scenarios such as, for example, powder oxidation.

The control computer 434 may be configured to control operations of the additive manufacturing apparatus 400. In some embodiments, the control computer may be one or more computers 102 from FIG. 2 or the computer 305 from FIG. 3. In some embodiments, the control computer 434 may be a controller built into or configured to interface with the additive manufacturing apparatus 400.

Various embodiments disclosed herein provide for the use of a computer control system. A skilled artisan will readily appreciate that these embodiments may be implemented using numerous different types of computing devices, including both general purpose and/or special purpose computing system environments or configurations.

Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or nontransitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

The control computer 434 may be connected to a laser scanning device 444. The laser scanning device may include movable mirrors which can direct the laser beam received from a laser source into the building area. The laser source may also be a movable laser source, or it may also be the laser scanner provided in a stereolithography device 400. The control computer 434 may further include software which controls the movement and functionality of the laser scanning system 444. As such, the control computer 434 may be configured to control the moment and activation of the laser scanning device.

The control computer 434 may further be configured to interface with an image acquisition assembly 436, such as to receive data/images from the image acquisition assembly 436. The control computer 434 may further be configured to process the data/images to determine if errors have or will occur in the build process as described herein. The control computer 434 may further be configured to control when and how the image acquisition assembly 436 captures images.

The image acquisition assembly 436 may be configured to attach to, be integrated with, and/or sit separate from the additive manufacturing apparatus 400 and placed in such a position to monitor the building area 450 and/or the build surface. Further, the image acquisition assembly 436 may be configured to be stationary, or moveable (such as based on control signals received from the control computer 434) to monitor the building area 450 from different angles.

The image acquisition assembly 436 may be configured to acquire images of a calibration plate 448 or a build surface. More particularly, the image acquisition assembly 436 may be configured to acquire images of laser spots and/or other markings made on the calibration plate 448 or build surface by the scanning system 444.

The image acquisition assembly 436 may include a camera, for example, an optical camera. The camera may be a commercial off-the-shelf ("COTS") digital camera having sufficient resolution to capture spots and other markings on the calibration plate 448 or build surface in sufficient detail to calibrate the scanning device. In some embodiments, the image acquisition assembly is selected from an optical camera, a thermal imaging device, an IR camera, or a sensor that transfers other signals to visual signals.

A camera may take the form of a special purpose camera which is configured to capture spots reflecting from the surface of the calibration plate. In order to capture spots on the calibration plate, it may be necessary to position the camera so that it points to the area near the spot created by a scanner in the scanning system 444. Accordingly, the image acquisition assembly 436 may also include a mount. In some embodiments, the mount may be a tilt-pan mount, which provides a range of motion sufficient to capture images in various locations on the calibration plate 448. The mount may be driven by a motor. The motor may be configured to receive control signals from the control computer 434 which provide instructions for the movement of the camera 450. In some embodiments, in addition to having a tilt-pan range of motion, the camera 450 may be further mounted on a projecting arm of a crane, commonly referred to as a jib. The jib may provide a further range of motion by allowing the camera not only to tilt and pan, but also to physically move its location in order to better acquire images of spots and/or markings on the calibration plate 448 or build surface.

It will be apparent to those skilled in the art that various modifications can be made in form and detail to the above-described example embodiments of the present disclosure without departing from the spirit or scope of the invention. Thus, it is intended that the present disclosure covers all such modifications provided they fall within the scope of the appended claims and their equivalents. The specifications and drawings are, accordingly, to be regarded in an illustrative sense rather than a restrictive sense.

What is claimed is:

1. A mold configured for shaping a product from a fiber-based material, the mold comprising:
    a perforated structure comprising:
        a plurality of lattices arranged in a stack, the plurality of lattices comprising:
            a first lattice comprising a first set of beams configured to form at least a first set of open spaces; and
            a second lattice, immediately above or below the first lattice, comprising a second set of beams configured to form at least a second set of open spaces,
            wherein the first set of beams differs from the second set of beams in configuration, and
            wherein at least one of the first set of open spaces partially overlaps a portion of the second set of beams.

2. The mold of claim 1, wherein the mold is a one-piece structure.

3. The mold of claim 1, wherein the mold is manufactured by additive manufacturing.

4. The mold of claim 1, wherein the product comprises at least a portion of one of a carton, tray, conformal packaging, a feminine hygiene product, or a diaper.

5. The mold of claim 1, wherein the fiber-based material comprises a raw material comprising one or more of paper pulp, cellulose, wood, wood-derived products, foam, polymer foam, shredded paper, or cotton wadding.

6. The mold of claim 1, wherein the first set of open spaces and the second set of open spaces are each configured to allow gas and/or liquid to pass through the first set of open spaces and the second set of open spaces.

7. The mold of claim 1, wherein at least one of the first set of open spaces and the second set of open spaces are configured to restrict fiber-based material from passing through.

8. The mold of claim 1, wherein the first set of open spaces and the second set of open spaces are configured to distribute a uniform density of the fiber-based material across at least a portion of the mold.

9. The mold of claim 1, wherein the plurality of lattices further comprises at least a third lattice comprising a third set of beams configured to form at least one third open space, the third lattice being immediately above or below the second lattice, the third set of beams having a different configuration from the second set of beams.

10. The mold of claim 1, wherein the first set of open spaces and the second set of open spaces in the stack form a non-linear path for gas or a liquid.

11. The mold of claim 1, wherein the first set of beams comprises a grid with at least one beam oriented in a first direction and at least one beam oriented in a second direction.

12. The mold of claim 11, wherein the first direction is orthogonal to the second direction.

13. The mold of claim 1, wherein the first set of beams differs from the second set of beams in one or more of a number of beams in the set, rotation of the set of beams with respect to a central axis through the stack, or size of the open space between the beams.

14. The mold of claim 1, wherein the plurality of lattices are ordered in the stack by size of openings.

\* \* \* \* \*